(12) United States Patent
Calilung et al.

(10) Patent No.: US 8,911,076 B2
(45) Date of Patent: *Dec. 16, 2014

(54) FLOATING LENS MOUNTING SYSTEM

(71) Applicant: Oakley, Inc., Foothill Ranch, CA (US)

(72) Inventors: Ryan Calilung, Irvine, CA (US); David Ginther, Ladera Ranch, CA (US); Hans Karsten Moritz, Foothill Ranch, CA (US); Carlos D. Reyes, Rancho Santa Margarita, CA (US); Ryan Saylor, Mission Viejo, CA (US); An Tran, Austin, TX (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,048

(22) Filed: Mar. 19, 2013

(65) Prior Publication Data

US 2013/0271723 A1  Oct. 17, 2013

Related U.S. Application Data

(63) Continuation of application No. 13/154,209, filed on Jun. 6, 2011, now Pat. No. 8,408,695, which is a continuation of application No. 12/497,632, filed on Jul. 3, 2009, now Pat. No. 7,954,942.

(60) Provisional application No. 61/078,326, filed on Jul. 3, 2008.

(51) Int. Cl.
| | |
|---|---|
| *G02C 1/08* | (2006.01) |
| *G02C 1/06* | (2006.01) |
| *G02C 5/00* | (2006.01) |
| *G02C 5/12* | (2006.01) |
| *G02C 1/00* | (2006.01) |

(52) U.S. Cl.
CPC ........ *G02C 5/008* (2013.01); *G02C 1/06* (2013.01); *G02C 2200/08* (2013.01); *G02C 5/12* (2013.01); *G02C 1/10* (2013.01); *G02C 1/08* (2013.01)
USPC ............... 351/98; 351/90; 351/137; 351/154

(58) Field of Classification Search
CPC ......... G02C 1/08; G02C 5/12; G02C 2200/06
USPC ............................ 351/90–102, 130–139, 154
See application file for complete search history.

(56) References Cited

U.S. PATENT DOCUMENTS

| | | |
|---|---|---|
| 1,918,954 A | 7/1933 | Baker |
| 1,942,393 A | 1/1934 | Baker |

(Continued)

FOREIGN PATENT DOCUMENTS

| | | | | |
|---|---|---|---|---|
| DE | 10 204 058 631 A1 | * | 6/2006 | ............... G02C 1/08 |
| EP | 0121018 | | 10/1984 | |

(Continued)

OTHER PUBLICATIONS

Extended European Search Report received in corresponding Application No. 09774592.1, dated Jan. 6, 2012 in 10 pages.

(Continued)

*Primary Examiner* — Huy K Mai

(74) *Attorney, Agent, or Firm* — Knobbe Martens Olson & Bear, LLP

(57) ABSTRACT

Various embodiments of an eyeglass and eyeglass system are provided that can maintain the geometric and optical quality of a lens supported by the eyeglass. The eyeglass can comprise a frame, a support member carried by the frame, and a lens mounting area or groove extending at least partially along at least one of the frame and the support member. The support member can be pivoted, moved, or deflected relative to the frame between a retaining position and an open position. In the open position, the lens can be seated within the lens mounting area. In the retaining position, the support member and the frame retain the lens without exerting deformative forces on the lens. Accordingly, the as-molded geometric and optical qualities of the lens can be preserved.

24 Claims, 28 Drawing Sheets

(56) References Cited

U.S. PATENT DOCUMENTS

| | | |
|---|---|---|
| 1,943,910 A | 1/1934 | Baker |
| 2,443,422 A | 6/1948 | Hansen |
| 2,652,746 A | 12/1950 | Shanks |
| 2,799,862 A | 7/1957 | Rowe |
| 3,229,303 A | 1/1966 | Jonassen |
| 3,383,707 A | 5/1968 | McNeill |
| 3,395,964 A | 8/1968 | Chartrice |
| 3,552,840 A | 1/1971 | Braget |
| 3,826,564 A | 7/1974 | Werling |
| 3,829,201 A | 8/1974 | Whiting |
| 3,931,646 A | 1/1976 | Loughner |
| 4,056,853 A | 11/1977 | Bottazzini et al. |
| 4,176,921 A | 12/1979 | Matthias |
| 4,304,469 A | 12/1981 | Solomon |
| 4,340,282 A | 7/1982 | Murakami |
| 4,515,448 A | 5/1985 | Tackles |
| 4,527,291 A | 7/1985 | Nussbickl |
| 4,616,367 A | 10/1986 | Jean et al. |
| 4,715,702 A | 12/1987 | Dillon |
| 4,813,775 A | 3/1989 | Kaksonen |
| 4,822,158 A | 4/1989 | Porsche |
| 4,843,655 A | 7/1989 | Hegendorfer |
| 4,859,048 A | 8/1989 | Jannard |
| 4,867,550 A | 9/1989 | Jannard |
| 4,901,374 A | 2/1990 | Van der Woude |
| 4,951,322 A | 8/1990 | Lin |
| 5,048,944 A | 9/1991 | Porsche |
| 5,056,163 A | 10/1991 | Chou |
| 5,144,344 A | 9/1992 | Takahashi et al. |
| 5,182,587 A | 1/1993 | Hyoi |
| 5,208,614 A | 5/1993 | Jannard |
| 5,270,743 A | 12/1993 | Hofmair et al. |
| 5,357,292 A | 10/1994 | Wiedner |
| 5,373,331 A | 12/1994 | Vallalla et al. |
| 5,379,463 A | 1/1995 | Schleger et al. |
| 5,390,369 A | 2/1995 | Tubin |
| 5,400,089 A | 3/1995 | Danloup et al. |
| 5,418,580 A | 5/1995 | Sondrol |
| 5,423,092 A | 6/1995 | Kawai |
| 5,467,148 A | 11/1995 | Conway |
| 5,536,828 A | 7/1996 | Deluca et al. |
| 5,541,674 A | 7/1996 | Jannard |
| 5,583,583 A | 12/1996 | Wilson |
| 5,587,747 A | 12/1996 | Bernheiser |
| 5,602,603 A | 2/1997 | Bondet |
| 5,610,668 A | 3/1997 | Mage |
| 5,617,588 A | 4/1997 | Canavan et al. |
| 5,638,145 A | 6/1997 | Jannard et al. |
| 5,648,832 A | 7/1997 | Houston et al. |
| 5,652,954 A | 8/1997 | Paiement et al. |
| 5,657,106 A | 8/1997 | Herald et al. |
| 5,685,022 A | 11/1997 | Essman et al. |
| 5,689,323 A | 11/1997 | Houston et al. |
| 5,708,489 A | 1/1998 | Jannard |
| 5,752,280 A | 5/1998 | Hill |
| 5,760,866 A | 6/1998 | Wedeck et al. |
| 5,765,223 A | 6/1998 | McCausland |
| 5,768,716 A | 6/1998 | Porsche |
| 5,802,622 A | 9/1998 | Baharad et al. |
| 5,805,261 A | 9/1998 | Houston et al. |
| 5,809,580 A | 9/1998 | Arnette |
| 5,815,235 A | 9/1998 | Runckel |
| 5,862,529 A | 1/1999 | Moodie et al. |
| 5,898,469 A | 4/1999 | Wang |
| 5,914,767 A | 6/1999 | Wedeck et al. |
| 5,929,963 A | 7/1999 | McNeal |
| 5,963,293 A | 10/1999 | Jannard |
| 5,969,789 A | 10/1999 | Houston et al. |
| 5,971,536 A | 10/1999 | Chiu |
| 6,009,564 A | 1/2000 | Tackles et al. |
| 6,010,217 A | 1/2000 | Houston et al. |
| 6,010,218 A | 1/2000 | Houston et al. |
| D428,620 S | 7/2000 | Maturaporn |
| 6,086,199 A | 7/2000 | Holland et al. |
| 6,102,033 A | 8/2000 | Baribeau |
| 6,106,116 A | 8/2000 | Houston et al. |
| 6,168,271 B1 | 1/2001 | Houston et al. |
| 6,224,209 B1 | 5/2001 | Chen |
| 6,250,756 B1 | 6/2001 | Jannard |
| 6,273,564 B1 | 8/2001 | Wedeck et al. |
| 6,276,794 B1 | 8/2001 | Chiang |
| 6,349,422 B1 | 2/2002 | Schleger et al. |
| 6,357,873 B1 | 3/2002 | Spindelbalker |
| 6,428,165 B1 | 8/2002 | Rivera |
| 6,533,412 B1 | 3/2003 | Wang et al. |
| 6,561,647 B1 | 5/2003 | Chen |
| 6,637,877 B1 | 10/2003 | Hartley et al. |
| 6,712,465 B1 | 3/2004 | Teng |
| 6,749,299 B1 | 6/2004 | Hsu |
| 6,786,592 B2 | 9/2004 | Rivera |
| 6,863,395 B1 | 3/2005 | Teng |
| 6,877,169 B2 | 4/2005 | Acquaviva |
| 6,923,537 B2 | 8/2005 | Hartley et al. |
| 6,926,404 B2 | 8/2005 | Bassahon et al. |
| 6,928,663 B1 | 8/2005 | Tappeiner |
| 6,929,364 B1 | 8/2005 | Jannard |
| 6,948,813 B2 | 9/2005 | Parks |
| 6,964,067 B1 | 11/2005 | Hartman |
| 7,000,263 B2 | 2/2006 | McNeal |
| 7,003,802 B2 | 2/2006 | Broersma |
| 7,036,152 B2 | 5/2006 | Gafforio et al. |
| 7,100,215 B2 | 9/2006 | Shiue |
| 7,137,700 B2 | 11/2006 | DiChiara et al. |
| 7,163,289 B2 | 1/2007 | Wedeck et al. |
| 7,219,992 B1 | 5/2007 | Wu |
| 7,219,993 B1 | 5/2007 | Chiou |
| 7,222,958 B1 | 5/2007 | Chiou |
| 7,222,959 B2 | 5/2007 | Jannard |
| 7,234,808 B2 | 6/2007 | Bruck |
| 7,261,410 B1 | 8/2007 | Chen |
| 7,343,631 B2 | 3/2008 | Lin |
| 7,478,906 B2 | 1/2009 | Fielding |
| 7,481,529 B1 | 1/2009 | Chen |
| 7,497,569 B2 | 3/2009 | Webb |
| 7,520,605 B1 | 4/2009 | Chen |
| 7,585,073 B2 | 9/2009 | Paolino |
| 7,604,346 B2 | 10/2009 | Wang |
| 7,681,257 B1 | 3/2010 | Broersma |
| 7,686,449 B2 | 3/2010 | Jannard et al. |
| D615,580 S | 5/2010 | Baden et al. |
| 7,712,894 B2 | 5/2010 | Tsai |
| D622,304 S | 8/2010 | Baden et al. |
| 7,810,174 B2 | 10/2010 | Matera |
| 7,850,301 B2 | 12/2010 | DiChiara |
| 7,856,673 B2 | 12/2010 | Reed |
| 7,887,181 B1 | 2/2011 | Chen |
| D640,727 S | 6/2011 | Moritz et al. |
| 7,954,942 B2 * | 6/2011 | Calilung et al. ............ 351/98 |
| D646,708 S | 10/2011 | Baden et al. |
| 8,192,015 B2 | 6/2012 | Taylor et al. |
| 8,316,470 B2 | 11/2012 | McNeal et al. |
| 8,408,695 B2 * | 4/2013 | Calilung et al. ............ 351/98 |
| 8,414,119 B2 | 4/2013 | Yeh |
| 8,469,510 B2 | 6/2013 | Belbey et al. |
| 8,534,830 B2 | 9/2013 | Taylor et al. |
| 8,661,562 B2 | 3/2014 | Calilung et al. |
| 8,668,330 B2 | 3/2014 | Reyes et al. |
| 8,746,877 B2 | 6/2014 | Belbey et al. |
| 2003/0188376 A1 | 10/2003 | Dondero |
| 2004/0139532 A1 | 7/2004 | Parks |
| 2004/0141147 A1 | 7/2004 | Cyr |
| 2005/0132478 A1 | 6/2005 | Canavan |
| 2005/0160521 A1 | 7/2005 | Hussey |
| 2005/0270477 A1 | 12/2005 | Curci et al. |
| 2006/0048289 A1 | 3/2006 | Shiue |
| 2006/0119790 A1 | 6/2006 | Tsai |
| 2006/0179554 A1 | 8/2006 | Barton |
| 2006/0256281 A1 | 11/2006 | Li |
| 2007/0024806 A1 | 2/2007 | Blanshay et al. |
| 2007/0033718 A1 | 2/2007 | Lin |
| 2007/0109490 A1 | 5/2007 | Collier et al. |
| 2007/0121059 A1 | 5/2007 | Chiou |
| 2007/0153230 A1 | 7/2007 | Musal et al. |
| 2007/0200997 A1 | 8/2007 | Jannard |

(56) References Cited

U.S. PATENT DOCUMENTS

| | | |
|---|---|---|
| 2008/0137028 A1 | 6/2008 | Webb |
| 2008/0155736 A1 | 7/2008 | Paulson et al. |
| 2008/0198323 A1 | 8/2008 | Siu |
| 2008/0301858 A1 | 12/2008 | Wang-Lee |
| 2008/0304005 A1 | 12/2008 | DiChiara |
| 2009/0019620 A1 | 1/2009 | Reed |
| 2009/0038057 A1 | 2/2009 | Tews |
| 2009/0313746 A1 | 12/2009 | Wang |
| 2010/0085533 A1 | 4/2010 | Calilung et al. |
| 2010/0186153 A1 | 7/2010 | Reyes et al. |
| 2011/0194065 A1 | 8/2011 | Belbey et al. |
| 2011/0225709 A1 | 9/2011 | Saylor et al. |
| 2011/0225710 A1 | 9/2011 | Reyes et al. |
| 2011/0225711 A1 | 9/2011 | Reyes et al. |
| 2011/0258758 A1 | 10/2011 | Renaud |
| 2011/0299026 A1 | 12/2011 | Calilung et al. |
| 2012/0038879 A1 | 2/2012 | Reyes et al. |
| 2012/0218504 A1 | 8/2012 | Taylor et al. |
| 2012/0218507 A1 | 8/2012 | Calilung et al. |
| 2012/0255104 A1 | 10/2012 | Didier |
| 2013/0083285 A1 | 4/2013 | McNeal et al. |
| 2013/0104300 A1 | 5/2013 | Park |
| 2013/0286345 A1 | 10/2013 | Belbey et al. |

FOREIGN PATENT DOCUMENTS

| | | |
|---|---|---|
| EP | 0496292 | 1/1991 |
| EP | 1 810 648 | 7/2007 |
| EP | 1830221 | 9/2007 |
| FR | 1126329 | 11/1956 |
| FR | 2088866 | 1/1972 |
| FR | 2626683 | 8/1989 |
| FR | 2688322 | 12/1992 |
| FR | 2 800 173 | 4/2001 |
| GB | 512419 | 9/1939 |
| GB | 2199155 | 6/1988 |
| GB | 2278459 | 11/1994 |
| JP | 59-79827 | 5/1984 |
| JP | 59-104127 | 6/1984 |
| JP | 219021 | 2/1990 |
| JP | 2002-228986 | 8/2002 |
| WO | WO 98/30930 | 7/1998 |
| WO | WO 03/023495 | 3/2003 |
| WO | WO 2010/003143 | 1/2010 |
| WO | WO 2010/181043 | 7/2010 |

OTHER PUBLICATIONS

International Search Report and Written Opinion received in corresponding PCT Application No. PCT/US09/49653, mailed Aug. 19, 2009, 12 pages.

International Preliminary Report on Patentability on International Application No. PCT/US2009/049653, dated Jan. 5, 2011 in 7 pages.

* cited by examiner

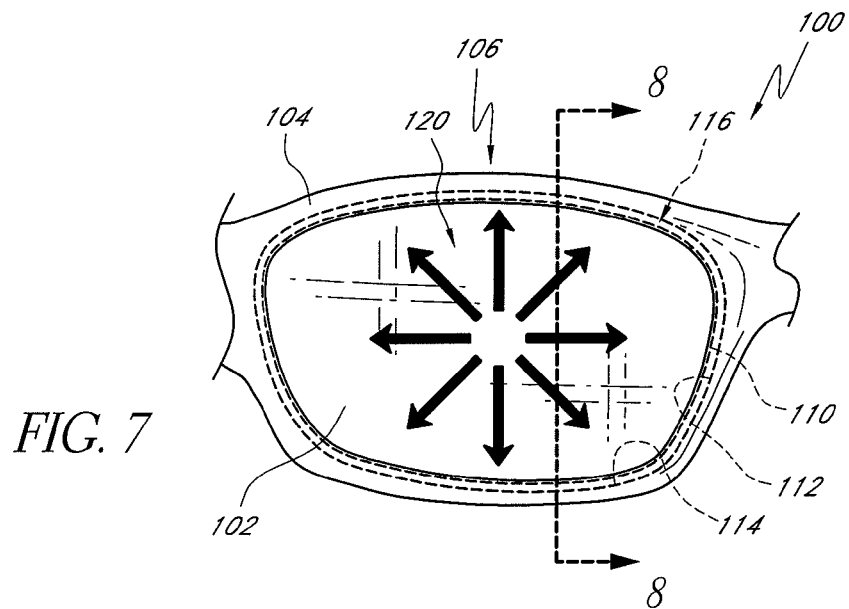
FIG. 7
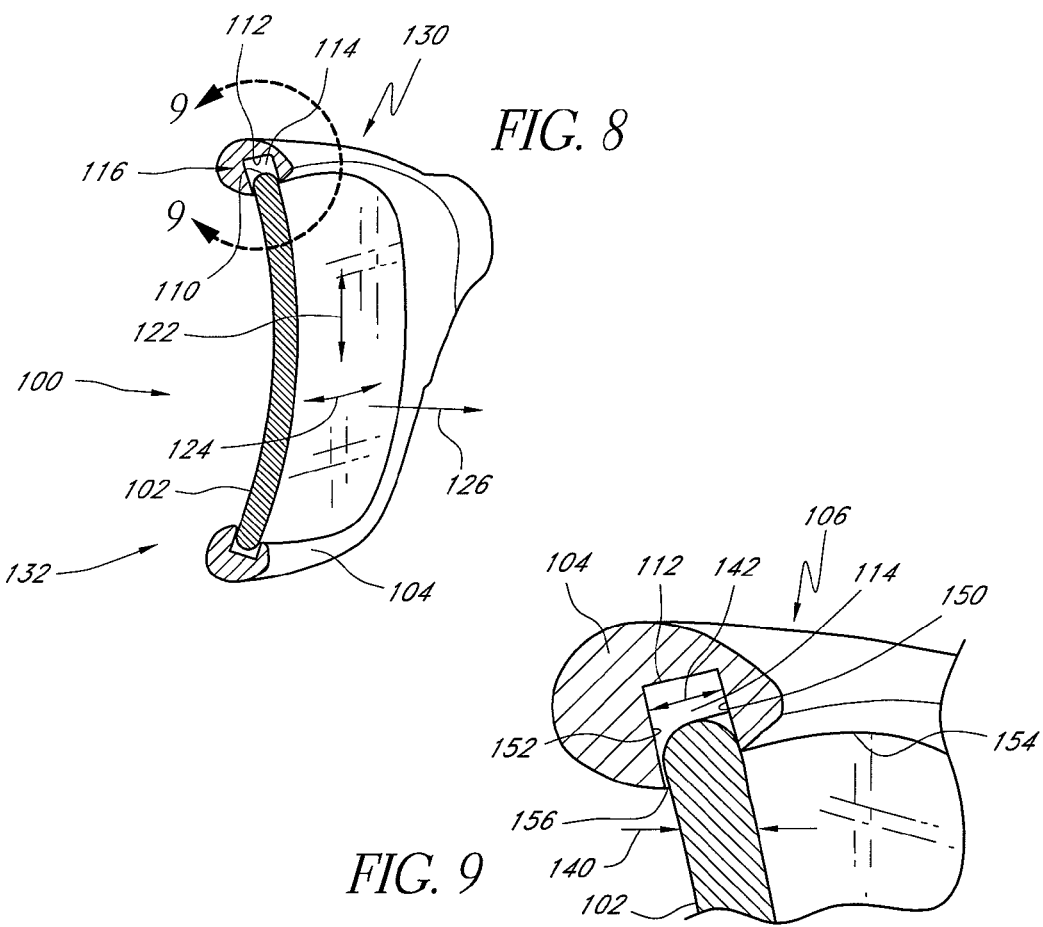
FIG. 8
FIG. 9

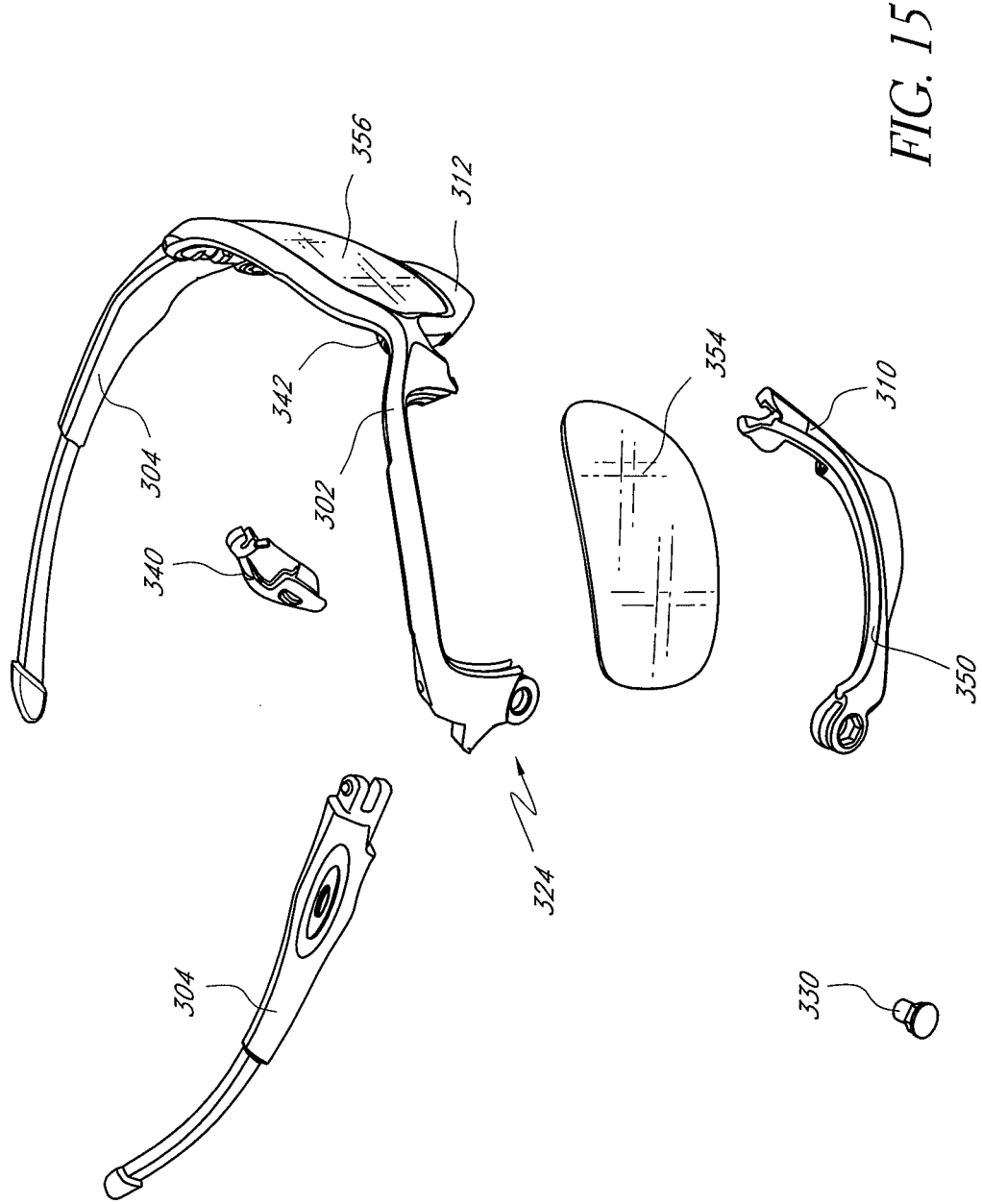

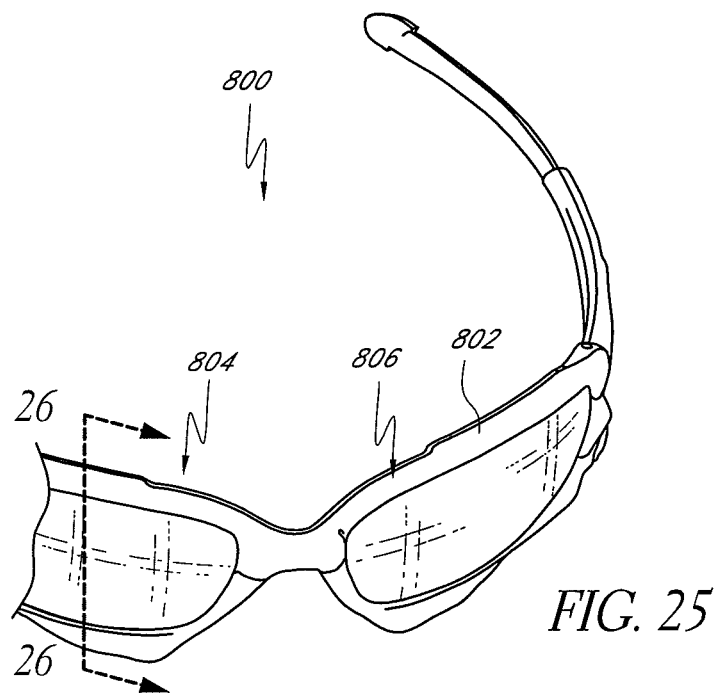
FIG. 25
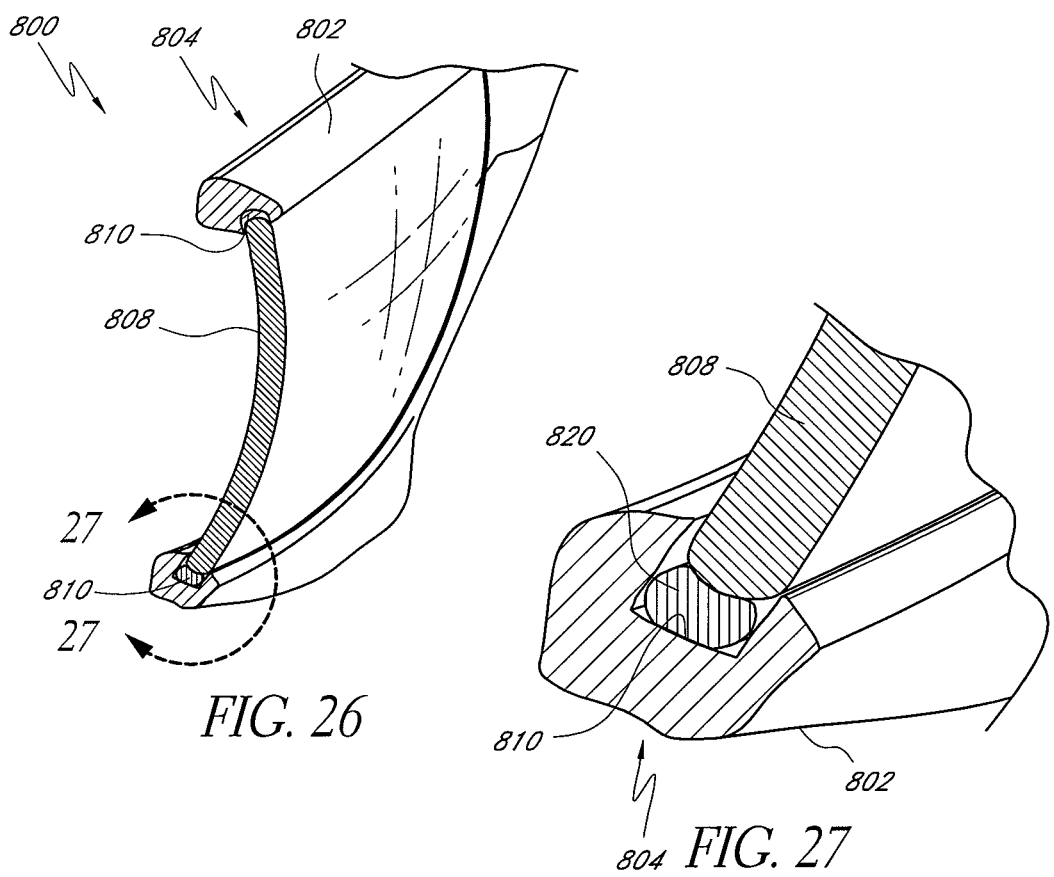
FIG. 26
FIG. 27

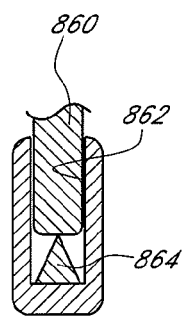
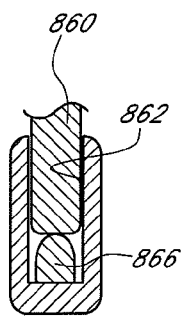
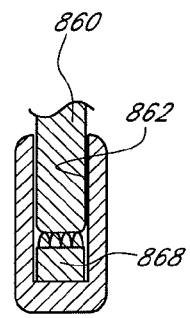
FIG. 32A　　　　FIG. 32B　　　　FIG. 32C
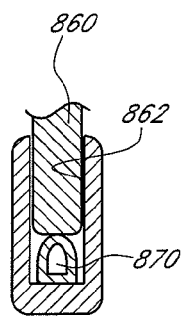
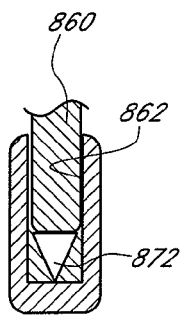
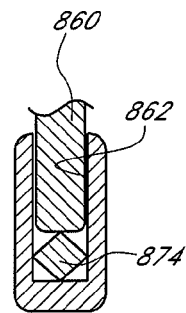
FIG. 32D　　　　FIG. 32E　　　　FIG. 32F
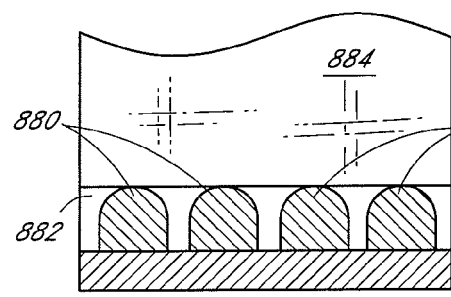
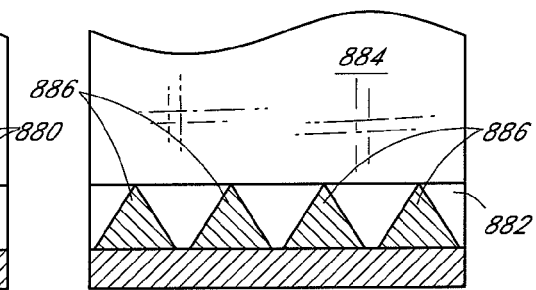
FIG. 33A　　　　　　　FIG. 33B

FLOATING LENS MOUNTING SYSTEM

CROSS-REFERENCE TO RELATED APPLICATIONS

This application is a continuation of U.S. application Ser. No. 13/154,209, filed Jun. 6, 2011, which is a continuation of U.S. application Ser. No. 12/497,632, filed Jul. 3, 2009, which claims the benefit of U.S. Provisional Application No. 61/078,326, filed Jul. 3, 2008, the entireties of which are incorporated herein by reference.

BACKGROUND

1. Field of the Inventions

The present inventions relate generally to mounting systems for eyewear. More specifically, the present inventions relate to methods and apparatuses for mounting an optical lens in a manner that maintains the original as-molded or pre-mounted geometry of the lens in order to maintain the geometry and superior optical performance.

2. Description of the Related Art

Various improvements have been made in recent years in the eyewear field. For example, the unitary cylindrical lens was popularized by Blades® (Oakley, Inc.) eyewear which incorporated, among others, the technology of U.S. Pat. No. 4,859,048, issued to Jannard. Toroidal unitary lens geometry having a constant horizontal radius throughout was introduced through a variety of products in the M Frame® line of eyeglasses, also produced by Oakley, Inc. See, e.g., U.S. Pat. No. 4,867,550 to Jannard. Various other improvements in eyewear systems are exemplified in U.S. Pat. Nos. 4,674,851, 4,730,915, 4,824,233, 4,867,550, 5,054,903, 5,137,342, 5,208,614 and 5,249,001, all to Jannard, et al. These improvements and others represent a meaningful advance in the optical performance of eyewear.

One continuing objective in the field of high quality eyewear, particularly that is intended for use in high speed action sports, is minimizing distortion introduced by the eyewear. Distortion may be introduced by any of a variety of influences, such as poor construction materials for the optical portion of the lens and inferior polishing and/or molding techniques for the lens. In addition, optical distortion can result from the interaction of the lens with the frame, such as changes in the shape of the lens orbital or poor orientation of the lens with respect to the normal line of sight.

Eyeglass systems which use a polymeric or metal wire frame are susceptible to bending and flexing due to a variety of environmental causes such as impact, storage induced and other external forces, forces resulting from the assembly process of the eyewear, and exposure to sunlight and heat. Flexing of the lens or uncontrolled deviation of the orientation of one lens with respect to the other or with respect to the ear stems can undesirably change the optical characteristics of the eyeglasses, whether the lens is corrective (prescription) or noncorrective.

Additionally, many eyewear systems are assembled in which the lens is retained using an interference fit. Although this may occur in unitary lens eyewear, dual lens eyewear tends to commonly be assembled using an interference fit. In particular, dual lens eyewear comprises a frame having a pair of orbitals that support lenses of the eyeglasses. The frame is usually formed as a single component that is later hingedly attached to left and right ear stems that allow the eyeglasses to be worn by a user, as shown in FIG. 1. FIG. 1 illustrates an exemplary prior art eyeglass 10 including a frame 12 that has left and right orbitals 14 configured to support respective left and right and lenses 16.

As shown in front view of the eyeglass 10 of FIG. 2, the left and right orbitals 14 generally continuously surround the respective left and right lenses 16. In order to accommodate the lenses 16 in the orbitals 14 of the frame 12, the orbitals 14 typically include a groove 18 that runs within the perimeter of the orbital 14, as shown in FIG. 3. The groove 18 is generally formed to match the perimeter geometry of the lens 16. During assembly of the eyeglass, the lens 16 is forcibly inserted into the groove 18 of the orbital 14.

The design of such eyeglasses generally provides for simple and swift manufacture of the product. Indeed, such a design is also advantageous because relatively few steps or components are required in the assembly in order to create the final product. Consequently, the above-discussed design and manufacture have been utilized in eyewear industry for years due to the simplicity and ease of manufacture.

SUMMARY

Despite the long-standing utility of prior art eyewear designs, an aspect of at least one embodiment of the present inventions includes the realization that the lenses of the prior art eyeglasses as mounted provide decreased optical quality at least because the design of the eyeglasses and the method of manufacturing these eyeglasses. In particular, according to at least one of the embodiments disclosed herein is the realization that the geometry of the lenses of prior art eyeglasses is distorted or deformed from its original as-molded or pre-mounted geometry when mounted in the eyeglass, thus creating one or more optical aberrations in the lens and thereby degrading the optical performance of the lens. In order to solve this and other problems of the prior art, various embodiments disclosed herein provide for unique solutions that allows a lens to be mounted in an eyeglass such that the lens is not deformed and therefore maintains superior optical qualities.

For example, even when the lenses of prior art eyeglasses are dimensionally accurate and provide excellent optics in their original as-molded or pre-mounted geometry, these lenses can be initially compressed and bended in order to insert the lenses into fixed-dimension orbitals. In many types of the eyewear, the orbitals may also be tightened around the periphery of the lens. In other cases, a misshapen lens support or orbital may cause an otherwise geometrically and optically correct lens to be bended from original as-molded or pre-mounted geometry once the lens is mounted in the orbital. In these cases, the geometry of the lens is altered from the original as-molded or pre-mounted geometry after being mounted with the orbital. Moreover, any dimensional deviations of the orbitals or the lenses can result in over-compression and severe bending of the lenses, as discussed below.

A prior art eyeglass having a fixed-dimension full orbital is shown in the enlarged cross-sectional view of FIG. 3. Such a prior art eyeglass intentionally comprises a lens 16 that will have a geometry that initially exceeds the internal geometry of the groove 18. Yet, there are often circumstances in which the lens is much larger than intended; this often results from common dimensional and manufacturing irregularities. As a result, this type of fixed-dimension prior art eyewear is characterized by a lens 16 that undergoes substantial compressive stresses or bending during and after the lens 16 is forced into the orbital 14 that results in geometric alterations of the lens. As such, even if the lens provided excellent optics before being mounted, the optics of the lens after mounting are diminished due to geometric distortion.

The compressive or bending forces exerted on the lens 16 may occur during and after the lens 16 is mounted in the frame and can cause geometric alteration in the lens 16, which is the source of optical aberrations or astigmatic distortions. For example, after the lens 16 is mounted in the orbital 14 of a prior art eyeglass, forces can be exerted on the lens 16 in one or more directions, as represented by the arrows illustrated in FIG. 4. These forces will cause lens 16 to deviate from its intended original as-molded or pre-mounted shape or geometry, as shown FIG. 5, creating various optical aberrations such as a prismatic shift of light as it passes through the lens 16. Such forces can cause alterations of the lens geometry from its original as-molded or pre-mounting geometry as seen in a horizontal and/or vertical cross-section of the lens 16. As a result of the geometric distortion of the lens, the optical performance of such an eyeglass is compromised.

Therefore, in accordance with at least one of the embodiments disclosed herein is the realization that there is a need in the art to provide an eyeglass which allows lenses to retain their original as-molded or pre-mounted geometry and thereby preserve the optical quality of the lenses. More specifically, there is a need in the art for an eyewear frame that allows a lens to be mounted in the orbital of the frame while experiencing little to no compressive stress during or after assembly and during wear that could result in alteration of the geometry of the lens.

Furthermore, in accordance with an embodiment disclosed herein is the realization that the lens of an eyeglass may be flexed or bended during use of the eyeglass, thus distorting the geometry of the lenses and compromising their intended optical performance. The flexion or bending can be that which is observed in a horizontal and/or vertical plane of the lens, and can cause changes in the curvature of the lens. For example, as illustrated in FIG. 6, if an ear stem 30 of a prior art eyeglass 32 is flexed in a lateral direction 34 from an unstressed position 36 to a stressed position 38, flexion and flexural stress 40 is generally distributed equally along the ear stem 30 and a frame 42 of the eyeglass 32. As a result, a lens mounted in an orbital of the frame 36 is also flexed or bended. As noted above, upon deviation from its intended geometry, the lens will experience optical aberrations and degraded optical quality.

Therefore, in accordance with at least one of the embodiments disclosed herein is the realization that there is a need in the art for an eyeglass that does not create bending stresses in the lens as a result of geometric changes of other sections of the eyeglass, such as may be caused by lateral or medial flexion and/or torsion in the ear stems or frame. In particular, there is a need in the art for an eyeglass that isolates or protects the lens from bending or flexural stresses. For example, an eyeglass can be provided that includes discrete flex zones having different relative bending strengths that allow deflection of the eyeglass to occur primarily in selected areas and thereby prevent bending of the lens. These "flex zones" can absorb the bending, flexural or torsional stresses while allowing the lenses and/or orbitals to retain their original as-molded or pre-mounted geometry.

In other words, in accordance with at least one of the embodiments disclosed herein, there is provided an eyeglass frame comprising a bridge area and ear stem sections that are relatively more flexible than orbital frame portions of the eyeglass frame. Such an embodiment can greatly reduce and/or eliminate flexural or torsional stress on a lens disposed in the eyeglass frame. In such embodiments, the flexural or torsional stress can be transferred through the frame to the bridge section and the ear stem sections instead of being exerted on the orbital frame portions and the lens.

Additionally, various embodiments of the present inventions can be configured to maintain the original as-molded or pre-mounting geometry of the lens without incorporating the feature of having bridge and ear stem sections that are flexible relative to the orbital frame portions. It is contemplated that some embodiments disclosed herein can be advantageously configured to not only prevent distortion of the geometry of the lens, but can also be configured to prevent transmission of force to the lens. Indeed, the incorporation and use of these features will be apparent to one of skill in the art with the present disclosure.

Further, in accordance with an embodiment disclosed herein, there is provided an eyeglass frame that not only maintains the original as-molded or pre-mounting geometry of the lens, but also facilitates lens replacement by the user. In an additional embodiment, there is also provided an eyeglass frame that maintains the original as-molded or pre-mounting geometry of the lens, facilitates lens replacement by the user, and provides secure lens retention in case of impact.

Furthermore, in accordance with an embodiment disclosed herein, there is provided an eyeglass frame that substantially maintains the original as-molded or pre-mounted geometry of the lens through the use of deep lens grooves or channels in the eyeglass frame and one or more lens bumpers disposed within the grooves or channels for "soaking up" or compensating for manufacturing tolerances. In at least one an embodiment, a deep-grooved eyeglass frame is provided that incorporates a unique tolerance buffering system. The tolerance buffering system can ensure that a lens mounted in the frame is oriented in an optically-desirable position relative to the frame. As such, although the lens may have a profile that is much smaller than a corresponding profile of the groove, the lens can still be optimally positioned relative to the frame and the wearer's line of sight.

Accordingly, in an embodiment, an eyeglass is provided that is adapted to be carried by the head of a wearer and for maintaining geometry and optical quality of a lens supported by the eyeglass, the eyeglass comprising: a frame adapted to be carried by the head of a wearer; a lens support carried by the frame for positioning the lens in the path of the wearer's field of view; and a lens mounting area or groove being formed along an interior perimeter of the lens support of the frame, the groove defining anterior and posterior banks and a bed disposed intermediate the anterior and posterior banks, the bed defining a float profile, the anterior and posterior banks each defining respective anterior and posterior retention profiles; wherein an outer profile of the lens is less than the float profile of the bed and greater than the retention profiles of the anterior and posterior banks of the groove such that the lens is permitted to move within the groove of the lens support in vertical and medial-lateral directions without disengaging the groove.

The eyeglass can comprise a pair of lens supports, the lens supports being configured to support dual lenses. The anterior retention profile can be different than the posterior retention profile. The eyeglass can comprise one or more lens bumpers disposed within the lens mounting area or groove. The lens bumpers can be attached to the lens support. The lens can be maintained within the groove without geometric distortion of the lens from its original as-molded or pre-mounted geometry. At least one of the anterior and posterior banks can extend in a continuous curve about the first lens support. At least one of the anterior and posterior banks can comprise one or more flexible tabs for retaining the lens within the groove of the lens support. The groove can define a constant depth. A first opposing rim can define a first perimeter path and a second opposing rim can define a second perimeter path, wherein the first perimeter path circumscribes the second perimeter path.

In another embodiment, an eyeglass is provided for maintaining geometry and optical quality of a lens supported by the eyeglass, the eyeglass comprising: a frame adapted to be carried by the head of a wearer; a first lower support carried by the frame for positioning a first lens in the path of the wearer's field of view, the first lower support being attachable to the frame to define a first lens mounting area or groove and capture the first lens therein; a second lower support carried by the frame for positioning a second lens in the path of the wearer's field of view, the second lower support being attachable to the frame to define a second lens mounting area or groove and capture the second lens therein; wherein the first and second grooves are formed along an interior perimeter of the respective first and second lower supports and the frame upon attachment of the first and second lower supports portion of the lens support to the lower portion of the lens support, the groove defining opposing banks and a bed disposed intermediate the opposing banks, the bed defining a float profile, the opposing banks each defining respective retention profiles; wherein the float profile of the bed is greater than a corresponding profile of the lens, and the corresponding profile of the lens is less than the retention profiles of the banks of the groove such that the first and second lenses are permitted to move within the respective first and second grooves without disengaging from the groove.

The first and second orbitals can comprise titanium. The first and second lower supports can be formed by injection molding. The first and second lower supports can comprise metal.

In yet another embodiment, an eyeglass is provided for maintaining geometry and optical quality of a lens supported by the eyeglass, the eyeglass comprising: a frame adapted to be carried by the head of a wearer, the frame extending about less than an entirety of a perimeter of the lens such that the frame defines at least first and second free ends; a jaw pivotably attached to the first end the frame and having a free end extending from the first end of the frame to the second end of the frame such that the frame and the jaw at least partially surround the perimeter of the lens for positioning a first lens in the path of the wearer's field of view, the jaw and the frame define a lens mounting area or groove for receiving the lens therein; and a latch member being pivotally attached to the second end of the frame, the latch member being movable between an engaged position and a disengaged position, the latch member being in an engaged position to capture at least a portion of the free end of the jaw for securing the free end of the jaw to the second end of the frame.

The latch member can be disposed on a medial end of the frame. The latch member can serve as a portion of a nosepiece of the eyeglass. The latch member can pivot in a medial-lateral direction. The eyeglass can further comprise one or more lens bumpers disposed within the groove. The groove can be formed along an interior perimeter of the respective frame and the jaw upon attachment of the jaw to the frame, the groove defining opposing banks and a bed disposed intermediate the opposing banks, the bed defining a float profile, the opposing banks each defining respective retention profiles. The float profile of the bed can be greater than a corresponding profile of the lens, and the corresponding profile of the lens can be less than the retention profiles of the banks of the groove such that the lens is permitted to move within the groove without disengaging from the groove. The eyeglass can further comprise one or more lens bumpers attached to the lens.

In some embodiments, the jaw can be formed monolithically with the frame. For example, in an eyeglass having dual lenses, the ends of the jaws for each side of the eyeglass can be formed monolithically with the frame portions thereof. In other words, the frame and the jaws can be monolithically formed, such as by injection molding. An embodiment can be provided wherein the jaws are formed of a material that permits the jaws to pivot, move, or deflect such that free ends of the jaws can be separated from and moved toward the second ends of the frame to allow interchange of lenses. In another embodiment, a movable joint can be formed into the junction between the jaw and the frame in order to enable the free ends of the jaws to pivot, move, or deflect towards or away from the second ends of the frame. In this manner, such embodiments of the eyeglass can be quickly and conveniently formed. For example, such embodiments can be integral or monolithic products that are formed through processes such as injection molding and the like. Such embodiments can advantageously reduce the number of parts and facilitate operation by the user.

In other embodiments, the latch member can also be monolithically formed with the eyeglass. For example, the latch member can be monolithically formed with the second end of the frame. An embodiment can be provided wherein the latch member is formed of a material that permits the latch member to pivot, move, or deflect to allow the jaws to be disengaged or engaged therewith. In another embodiment, a movable joint can be formed into the junction between the latch member and the frame in order to enable the latch member to pivot, move, or deflect to allow the jaws to be disengaged or engaged therewith.

In yet another embodiment, an eyeglass is provided for maintaining geometry and optical quality of a lens supported by the eyeglass and comprises a frame, a support member, and a securing member. The frame is adapted to be carried by the head of a wearer and can extend at least partially about a perimeter of the lens. The support member can be pivotably attached to the frame such that the support member can be pivoted relative to the frame between a retaining position and an open position. The support member can be moveable to the retaining position to capture at least a portion of the perimeter of the lens for mounting the lens in the path of the wearer's field of view. The securing member can be movable between an engaged position and a disengaged position. The securing member can be in an engaged position to secure the support member in the retaining position for securing the support member to the frame. Further, the securing member can be monolithically formed with the eyeglass.

In some embodiments, the frame can define at least a first free end, and the support member can be pivotally attached to the frame at the first free end thereof. The support member can also be pivotally attached to a first end of the frame, and the support member can have a free end that can be fixed relative to a second end of the frame such that the frame and the support member at least partially surround the perimeter of the lens for positioning the lens in the path of the wearer's field of view. The frame and the support member can define a rigid enclosure into which a lens can be received. The rigid enclosure can be configured to retain the lens without exerting deformative forces on the lens. Further, the support member can be formed monolithically with the frame and be configured to pivot, move, or deflect relative to the frame.

The support member and the frame can define a lens mounting area or groove for receiving the lens therein. Some embodiments of the eyeglass can also comprise one or more lens bumpers disposed within the groove. Further, the groove can be formed along an interior perimeter of the frame and the support member upon movement of the support member to the retaining position. The groove can defining opposing banks and a bed disposed intermediate the opposing banks. The bed can define a float profile. The opposing banks can each define respective retention profiles. The float profile of the bed can be greater than a corresponding profile of the lens. Further, the corresponding profile of the lens can be less than the retention profiles of the banks of the groove such that the lens is permitted to move within the groove without disengaging from the groove.

Additionally, the securing member can be a latch member that is pivotally attached to the second end of the frame. The latch member can be configured to engage the free end of the support member for securing the free end of the support member relative to the second end of the frame. The latch member can be monolithically formed with the second end of the frame and configured to pivot, move, or deflect with respect to the frame. The securing member can be a latch member that is pivotally attached to the frame. Further, the latch member can be disposed on a medial portion of the frame. In this regard, the eyeglass can further comprise a nosepiece section, and the nosepiece section can comprise the latch member. The latch member can pivot in a medial-lateral direction.

In some embodiments, the eyeglass can comprise dual lenses and a pair of support members. The support members of the eyeglass can be formed monolithically with the frame and configured to pivot, move, or deflect with respect to the frame. The eyeglass can also further comprise a lens having one or more lens bumpers attached to the lens.

In accordance with another embodiment, an eyeglass is provided for maintaining geometric and optical quality of a lens supported by the eyeglass and can comprise a frame and first and second supports. The frame can be adapted to be carried by the head of a wearer. The first support can be carried by the frame for positioning a first lens in the path of the wearer's field of view. The first support can have an open position and a retaining position in which the first support is fixed relative to the frame to define a first lens mounting area or groove and capture the first lens therein. The second support can also be carried by the frame for positioning a second lens in the path of the wearer's field of view. The second support can have an open position and a retaining position in which the second support is fixed relative to the frame to define a second lens mounting area or groove and capture the second lens therein.

In such embodiments, the first and second grooves can be formed along an interior perimeter of the respective first and second supports and the frame upon attachment of the first and second supports to the frame. The first and second grooves can define opposing banks and a bed disposed intermediate the opposing banks. The bed can define a float profile, and the opposing banks can each define respective retention profiles. Further, the float profiles of the beds can be greater than corresponding profiles of the lenses, and the corresponding profiles of the lenses can be less than the retention profiles of the banks of the groove such that the first and second lenses are permitted to move within the respective first and second grooves without disengaging from the groove.

In modified embodiments, the first and second supports can be pivotally coupled to the frame. For example, the first and second supports can define first and second ends. The first ends thereof can be pivotally attached to first ends of the frame. The first and second supports can have free ends that can be fixed relative to second ends of the frame such that the frame and the first and second supports at least partially surround the lenses for positioning the lenses in the path of the wearer's field of view.

Additionally, the first and second supports can be monolithically formed with the frame and configured to pivot, move, or deflect with respect to the frame. The first and second supports can be first and second lower supports that extend below the frame such that the frame supports upper ends of the lenses and the first and second supports support lower ends of the lenses.

Moreover, in some embodiments, the eyeglass can further comprise securing members that can be movable between engaged positions and disengaged positions. The securing members can each be moveable to the engaged position to fix the respective ones of the first and second supports relative to the frame. The securing members can be monolithically formed with the frame and configured to pivot, move, or deflect with respect to the frame. The securing members comprise latch members that are pivotally attached to second ends of the frame. The latch members can be configured to engage free ends of the first and second supports for securing the free ends thereof relative to second ends of the frame. The latch members can be disposed on a medial portion of the frame. The latch members can pivot in a medial-lateral direction.

In yet other embodiments, the frame and the respective ones of the first and second supports can define rigid enclosures into which the lenses can be received. The rigid enclosures can be configured to retain the lenses without exerting deformative forces on the lenses.

Furthermore, in another embodiment, an eyeglass frame is provided for maintaining an as-molded geometry of a lens. The frame can comprise a lens mounting area or lens groove configured to at least partially receive the lens. The frame can comprise a frame portion and a support member. The support member can be moveable relative to the frame portion to provide access to the groove in an open position and to retain the lens laterally within the groove in a closed position. In the closed position, the first frame portion and the support member can secure the lens within the groove without exerting deformative force of the lens.

The eyeglass frame can further comprising one or more lens bumpers disposed within the groove. Further, the eyeglass frame can also comprise a tolerance buffering system. The tolerance buffering system can comprise a plurality of lens bumpers for selective placement in the lens groove for ensuring that a lens mounted in the frame is oriented in an optically-desirable position relative to the frame.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures:

FIG. 7 is a front view of an eyeglass having a frame configured to maintain the original as-molded or pre-mounted geometry of a lens supported thereby by allowing the lens to "float," according to an embodiment of the present inventions.

FIG. 8 is a side cross-sectional view of the eyeglass of FIG. 7, taken along Section 8-8 of FIG. 7.

FIG. 9 is an enlarged partial side cross-sectional view of the eyeglass of FIG. 7, taken along Section 9-9 of the FIG. 8.

FIG. 15 is a perspective exploded view of the eyeglass frame of FIG. 13 illustrating the components thereof.

FIG. 25 is a partial perspective view of an eyeglass comprising one or more lens bumpers, in accordance with another embodiment.

FIG. 26 is a side cross-sectional view of the eyeglass of FIG. 25, taken along Section 26-26 of FIG. 25.

FIG. 27 is a partial side cross-sectional view of the eyeglass of FIG. 25, taken along Section 27-27 of FIG. 26.

FIGS. 32A-F are partial side cross-sectional views each taken along a medial-lateral axis of an eyeglass and illustrating cross-sectional geometries of embodiments of lens bumpers disposed in lens mounting areas or grooves of the eyeglasses, according to various embodiments.

FIGS. 33A-B are partial side cross-sectional views each taken along an anterior-posterior axis and illustrating cross-sectional geometries of embodiments of lens bumpers disposed in lens mounting areas or grooves of the eyeglasses, according to various embodiments.

DETAILED DESCRIPTION OF THE PREFERRED EMBODIMENT

Figure 1:
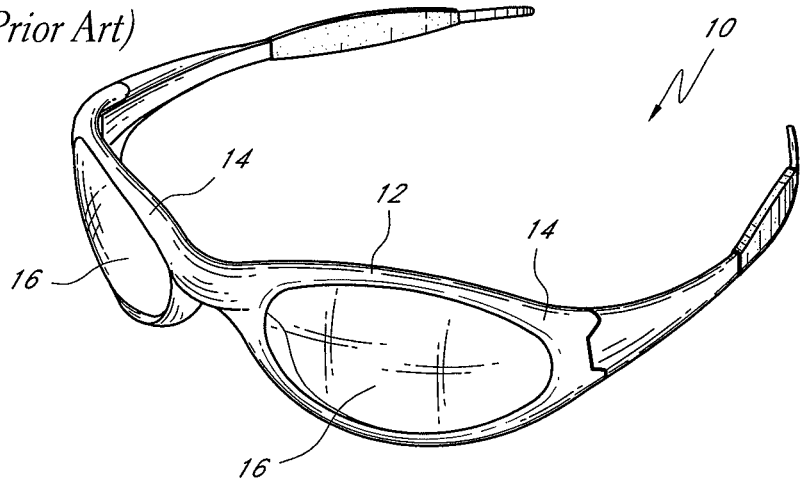
FIG. 1 is a perspective view of a prior art eyeglass.
Figure 2:
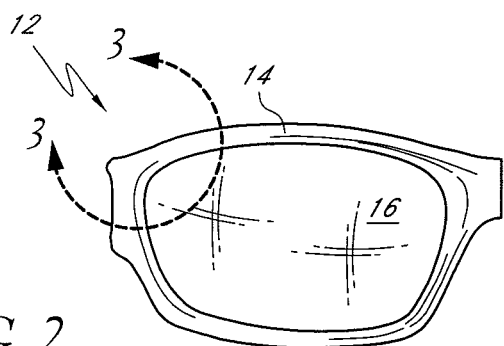
FIG. 2 is an enlarged partial front view of the prior art eyeglass illustrating a portion of the frame and a lens thereof.
Figure 3:
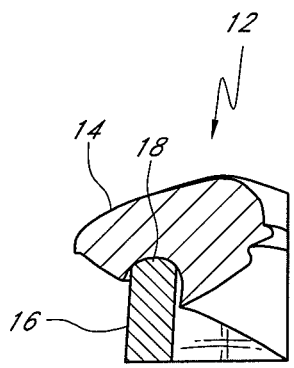
FIG. 3 is a side cross-sectional view of the eyeglass shown in FIG. 1 illustrating an interference fit of the lens with the frame, taken along Section 3-3 of FIG. 2.
Figure 4:
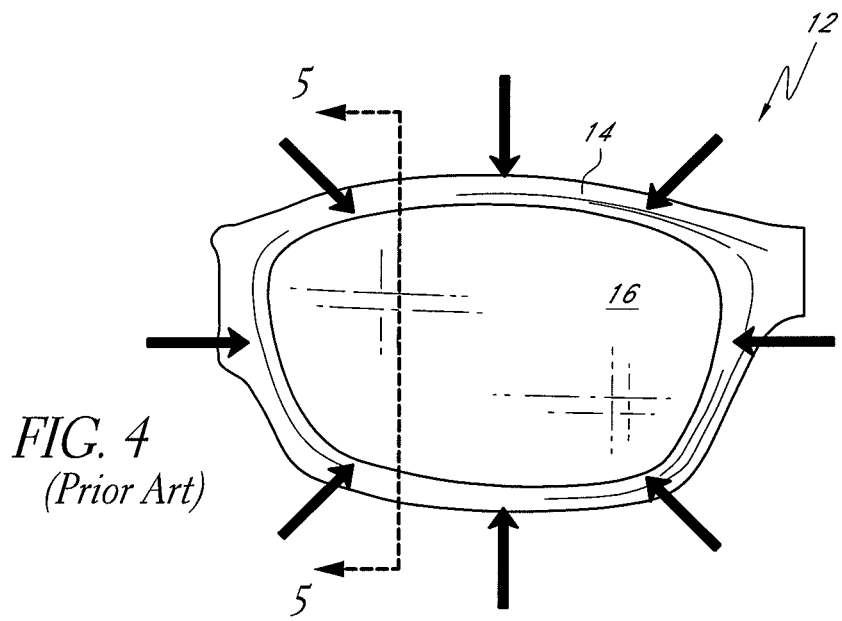
FIG. 4 is a front view of the prior art eyeglass of FIG. 1 illustrating various forces being exerted on the lens of the eyeglass.
Figure 5:
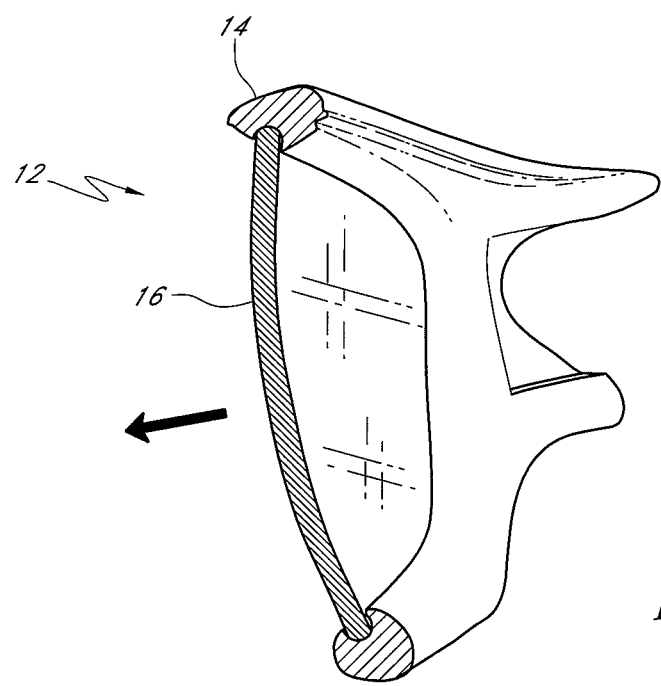
FIG. 5 is a side cross-sectional view of the prior art eyeglass shown in FIG. 4 illustrating various forces exerted on the lens and the resultant distortion of the geometry of the lens, taken along Section 5-5 of FIG. 4.
Figure 6:
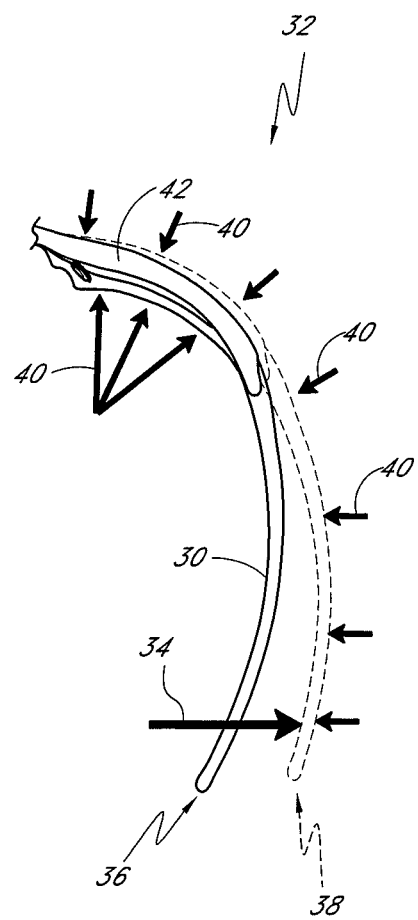
FIG. 6 is a top view of a prior art eyeglass illustrating lateral bending forces that are distributed along an ear stem, a frame, and a lens of the eyeglass.

While the present description sets forth specific details of various embodiments, it will be appreciated that the description is illustrative only and should not be construed in any way as limiting. Additionally, it is contemplated that although particular embodiments of the present inventions may be disclosed or shown in the context of unitary or dual lens eyewear systems, such embodiments can be used in both unitary and dual lens eyewear systems. Further, it is contemplated that although particular embodiments of the present inventions may be disclosed or shown in the context of frames having full orbitals, such embodiments can be used with frames having both full and partial orbitals. Furthermore, various applications of such embodiments and modifications thereto, which may occur to those who are skilled in the art, are also encompassed by the general concepts described herein.

As discussed above, the prior art eyeglasses illustrated in FIGS. 1-6 have limitations and disadvantages. Accordingly, in order to overcome the disadvantages of the prior art, various embodiments of the present inventions disclosed herein provide for an eyeglass configured to support a lens while maintaining the original as-molded or pre-mounting geometry of the lens. Some embodiments also provide for an eyeglass that is configured to prevent the transmission of forces to the lens. In some embodiments, the eyeglass can be configured to allow the lens to "float" relative to its frame.

Thus, in contrast to the prior art eyeglasses, embodiments disclosed herein provide that the lens need not be mounted in the frame in a manner that changes the geometry of the lens. This innovative feature of embodiments of the present inventions allows embodiments of the eyeglass frame disclosed herein to support the lens in a wearer's field of view while allowing the lens to maintain its original geometric shape. Accordingly, the lens is able to retain superior optical qualities.

For example, some embodiments can be configured to include an oversized or deep lens mounting area or groove into which a lens can be received. The groove can be configured to have a depth that defines a perimeter that is greater than a perimeter of the lens. Further, the groove can comprise anterior and posterior supports for maintaining the lens within the groove. In other words, the structure of the groove may generally permit medial-lateral (side-to-side) and superior-inferior (up-down) movement of the lens within the groove while generally restricting anterior-posterior (front-to-back) movement. Thus, the lens can be referred to as "floating" within the groove. These features can be used in lens supports or orbitals that at least partially or fully surround the lens.

The "floating" of the lens can therefore be achieved by providing a lens mounting area or groove or lens retention zone that extends at least partially along a lens support and that is configured to allow at least a minimal gap between the lens support and the lens in the medial-lateral, superior-inferior, and/or the front-to-back directions. A "floating" lens can also be substantially, if not entirely free of the forces that are typical of the interference fit used in prior art eyeglasses to retain the lens and that result in geometric distortion of the lens from its as-molded or pre-mounted geometry. In this regard, it is contemplated that a lens can "float" within the groove even though a force is exerted on the lens if that force does not result in geometric distortion of the lens from its as-molded or pre-mounted geometry.

In addition, by allowing the lens to float within the groove, the original as-molded or pre-mounting geometry and optical characteristics of the lens may be preserved following mounting in the lens support. Therefore, an objective of various embodiments can include preventing the transmission of geometrically distorting forces to the lens. This can be accomplished by providing a rigid eyeglass frame having a lens mounting area or groove configured to retain the lens without transferring forces to or creating stresses in the lens. For example, a lens support or orbital of the eyeglass can be created having dimensions and tolerances that provide sufficient floating gaps relative to the dimensions and tolerances of the lens. Accordingly, when mounted, the float gaps can ensure that the lens geometry is not altered. Further, if the orbital is rigid, the float gaps can be maintained during use of the eyeglass, thus preventing geometric distortion of the lens. Accordingly, the frame and the support member, jaw, or lens support can define a rigid enclosure into which a lens can be received. The rigid enclosure can be configured to retain the lens without exerting deformative forces on the lens.

Further, in the present description, the term "lens support member," "frame member," or "jaw" can refer to the that portion of the eyeglass that is moveable relative to the frame or frame portion in order to form retain one or more lenses. These terms can often be interchanged to refer to various structures illustrated and described herein.

In some embodiments, an eyeglass frame is provided which is configured to support a lens while minimizing and/or eliminating transmission of compressive and flexural stresses on the lens. Thus, compressive stresses directed from the perimeter toward a center of the lens, as well as compressive stresses in an anterior-posterior direction, can be minimized and/or eliminated. As mentioned above, just as the groove or lens slot can be deeper than necessary, the groove can also be wider than necessary. Such a configuration can be useful not only to prevent transmission of stresses, but may also account for manufacturing tolerances of the orbital and/or the lens. Indeed, in accordance with an embodiment disclosed herein is the realization that the smaller the float gap in the anterior-posterior direction, the tighter the groove pinches the lens, and the more efficiently dimensional irregularities of the groove will be transferred to lens.

In other embodiments, an eyeglass is provided that not only avoids geometric distortion of the lenses, but also allows the wearer to freely interchange parts of the eyeglass according to their preferences. The eyeglass can be configured to allow replacement of the lens or other such components. For example, a frame of the eyeglass can be configured to releasably receive the lens. In this regard, the frame can comprise one or more interconnected segments that can be detached from each other in order to allow the lens to be supported by the frame.

Additionally, embodiments of the eyeglass that minimize distortion of the lenses can optionally the eyeglass comprise one or more lens bumpers. The lens bumpers can be attached to a frame of the eyeglass and/or to the lens. The lens bumpers can "soak up" or compensate for manufacturing tolerances. For example, frame and lens dimensional tolerances are typically in the order of approximately +/−0.05 mm (+/−0.002 in.), thus yielding mismatches as high as 0.2 mm. Thus, the lens bumper can be used in some embodiments to compensate for inaccuracies in these tolerances.

The lens bumper can be used in a full or partial orbital. Furthermore, the lens bumper can be attached to either the lens or the groove. The lens bumper can be positioned between the lens and the orbital in any of the medial-lateral, superior-anterior, and/or anterior-posterior directions. The placement of the lens bumper along the lens or groove in these directions can aid in maintaining proper positioning of the lens without placing any stress on the lens. The lens bumper can also be used to provide a more exact orientation between the lens and the eyeglass. As discussed further below, the lens bumper can also comprise one or more components.

The lens bumper can also be formed from one or more materials that allows the lens bumper to be compressible and resilient, even with minimal loading. In other words, the lens bumpers can be made from a material that can provide deflection at relatively low loads (e.g. compressible but resilient foams, elastomeric materials, air bladders, gel-filled bladders, etc.).

In other embodiments, the lens bumper can be used to prevent excessive movement of the lens relative to the frame. The lens bumper can be designed and manufactured such that they do not transmit any loading to the lens sufficient to cause geometric distortion of the lens. In further embodiments, the lens bumper can protect the edges of the lens. Further, some embodiments provide for a lens bumper that reduces lens chatter with the frame. Finally, yet other embodiments provide for a lens bumper that tends to maintain a given position of the lens relative to the frame.

Other innovative aspects of the embodiments disclosed herein include the incorporation of discrete zones which can absorb bending stresses placed on the eyeglass. The eyeglass can incorporate such a feature in order to not only provide a more comfortable and custom fit, but also to prevent any loading of the lens that could geometrically distort the lens. Thus, the eyeglass will not only be comfortable, but will also provide excellent optical qualities.

For example, the eyeglass can be configured to include flex zones along one or more ear stem sections of the eyeglass. In another embodiment, the eyeglass can include a flex zone along a bridge section of a frame of the eyeglass. And it yet other embodiments, the eyeglass can include flex zones along the bridge section and the ear stem sections of the eyeglass. In any of these embodiments, any bending or torsional forces exerted on the eyeglass can be borne by the flex zones of the eyeglass and not by the lens. For example, in some embodiments, the use of one or more flex zones can prevent bending of an orbital frame portion of the eyeglass in which a lens is disposed.

Additionally, the eyeglass can be fabricated using a plurality of materials in order to impart desirable mechanical properties to the eyeglass. In this regard, the frame and ear stems of the eyeglass may be fabricated from different materials. Further, the frame and/or the ear stems of the eyeglass can each be fabricated using a plurality of materials that impart desirable mechanical properties to certain areas of the frame and/or ear stem sections. In this manner, the eyeglass can comprise given components having mechanical properties that vary along the given component.

For example, in some embodiments, a frame of the eyeglass can be configured to define rigid portions that support the lenses while a bridge section of the frame is flexible. Further, proximal portions of ear stem sections may be flexible while distal portions thereof are generally rigid. Other combinations and variations of the mechanical properties of the eyeglass can be manipulated in order to enhance the comfort and preserve the optical quality of the eyeglass.

In order to achieve desirable mechanical properties in the eyeglass, some embodiments also provide for a method of manufacturing the eyeglass through overmolding or comolding.

Furthermore, in some embodiments, the frame of the eyeglass can include one or more support ribs. The support rib can be used to maintain the geometric shape of the frame. For example, a support rib can be disposed along a frame portion of the eyeglass adjacent to the lens-receiving recess of the eyeglass. Further, the support rib can be disposed with a lens mounting area or groove of the eyeglass. The support rib can serve to strengthen the frame such that the frame portion will not tend to bend or deflect. In some embodiments, the support rib can extend about an entire orbital frame portion to provide rigidity and prevent deformation of the lens. Accordingly, such an embodiment of the eyeglass will also tend to reduce and/or eliminate bending of the lens supported by the frame.

It is contemplated that the support rib can be comolded with the eyeglass. However, it is also contemplated that a support rib can be combined with the eyeglass after the eyeglass has been manufactured. For example, in some embodiments, the support rib can be configured to sit within or along a lens mounting area or groove of the eyeglass or along a portion of a lens support. Further, the support rib can also be secured or removably coupled to the eyeglass.

Referring now to FIG. 7, one embodiment of an eyeglass prepared in accordance with aspect of the present inventions is illustrated. In particular, FIGS. 7-9 illustrate a "floating lens" feature that can be, but is not necessarily, incorporated into all embodiments of the eyeglass. FIG. 7 is a partial front view of an eyeglass 100 having a floating lens structure. Accordingly, a lens 102 of the eyeglass 100 can be configured to "float" relative to a frame 104 or lens support 106 of the eyeglass 100. The frame 104 can comprise a wire or nonwire frame.

As used herein, a "floating" lens refers to the geometric difference between a perimeter profile of the lens and an interior perimeter profile of a lens mounting area or groove of the frame, as discussed above. Further, with reference to FIG. 7, the term "floating" lens refers to the geometric difference between an outer profile or perimeter 110 of the lens 102 and an inner profile or perimeter 112 of a lens mounting area or groove 114 of the frame 104. As shown in the front view of FIG. 7, the lens 102 can be positioned horizontally and vertically within the groove 114 such that no portion of the outer profile or perimeter 110 of the lens 102 touches the inner profile or perimeter 112 of the groove 114. In other words, the lens 102 can be positioned within the groove 114 in the anterior-posterior, superior-inferior, and medial-lateral directions such that no portion of the outer profile or perimeter 110 of the lens 102 touches the inner profile or perimeter 112 of the groove 114.

This relationship between the perimeter profiles of the lens 102 and the groove 114 is also illustrated in the side view of FIG. 8. The horizontal and vertical spacing between the lens 102 and the groove 114 can therefore allow the lens 102 to float within the groove 114. Otherwise stated, the lens 102 can float within the groove 114 because of a gap 116 between the outer profile or perimeter 110, such as a perimeter edge, of the lens 102 and the inner profile or perimeter 112, such as a bed or lower surface, of the groove 114.

Accordingly, in some embodiments, the presence of the gap 116 can ensure that the lens is not distorted from its original as-molded or pre-mounting geometry. The presence of the gap 116 can also ensure that even if forces are transmitted to the lens 102, such forces will not be sufficient to cause distortion of the geometry of the lens 102. Additionally, as discussed below, in some embodiments, a difference between the widths of the lens and the groove can also ensure that no forces are transmitted to the lens 102.

Thus, the eyeglass can be configured to allow the lens to float in generally horizontal and/or vertical directions and combinations thereof. As noted by the multi-directional arrows 120 in FIG. 7, the floating lens 102 can move in any variety of directions relative to the frame 104. FIG. 8 also illustrates that the lens 102 can move in superior-inferior or medial-lateral directions 122, 124. As also noted herein, the lens 102 may also move in an anterior-posterior direction.

It is contemplated that in some embodiments, the lens can be a planar lens and the lens can slide or move within a plane. Nevertheless, in other embodiments, the lens can be configured in any variety of shapes, such as cylindrical, toroidal, spherical, etc. The eyeglass can be configured such that the lens can slide or move within three-dimensions, such as along a surface defined by a surface of the lens. The eyeglass can also be configured such that the lens can also slide or move along a three-dimensional surface defined by one or more curvatures and the perimeter of the groove.

A "floating" lens can additionally refer to a difference between a width of the lens and a width of the groove. The groove can be configured to prevent substantial movement of the lens in an anterior-posterior direction, which is illustrated in FIG. 8 with the arrow 126. However, it is contemplated that components can also work in combination with the groove to prevent substantial movement of the lens in a medial-lateral or superior-inferior direction.

For example, part of the groove can restrict movement in an anterior direction while another component restricts movement in a posterior direction, as discussed further herein. "Substantial movement" of the lens can be defined as any movement that would cause the lens to be separated from or fall out of the lens support. However, it is contemplated that while captured within the groove, the lens could float in a superior direction such that a lower edge of the lens exits the groove, or vice-versa. Similarly, the lens could float in a medial direction such that a lateral edge of the lens exits the groove. Nevertheless, in such scenarios, the lens is still retained by the groove and will not separate from or fall out of the lens support. Indeed, it would be undesirable to configure the groove such that the lens could fall out of the lens support or orbital completely.

As shown in FIG. 8, upper and lower portions 130, 132 of the lens 102 are received within the groove 114 of the frame 104. In the illustrated embodiment, the lens 102 can be generally constrained in the anterior-posterior direction 126 based on the difference between a width 140 of the lens 102 and a width 142 of the groove 114 as well as having a lens profile that is greater than an anterior or posterior retention profile of the groove 114, as discussed below and as shown in FIG. 9. The width 140 of the lens 102 can be less than a width 142 of the groove 114 in order to provide at least a de minimis amount of anterior-posterior movement such that the lens 102 can float within the groove 114. This de minimis amount of anterior-posterior movement can ensure that no compressive forces are transmitted from the frame 104 to the lens 102. Further, after being positioned within the groove, a floating lens can slide within the groove in any combination of medial-lateral and/or superior-inferior directions while being generally constrained in the anterior-posterior direction. Indeed, floating allows the lens to be constrained to a degree in all directions while providing that the lens is not geometrically distorted.

With reference to FIG. 9, the inner profile or perimeter 112 of the groove 114, which can be referred to as a bed or lower surface, extends generally transversely relative to anterior and posterior banks 150, 152 of the groove 114. The anterior bank 150 can define a first or anterior retention profile 154. The posterior bank 152 can define a second or posterior retention profile 156. The anterior and posterior banks 150, 152 can extend about the periphery of the lens support 106. The first or anterior retention profile 154 can be equal to or different from the second or posterior retention profile 156.

The anterior and posterior banks 150, 152 of the groove 114 can function to retain the lens 102 in the anterior-posterior direction. Other words, the lens 102 can be retained with the groove 114 and the anterior retention profile 154 and the posterior retention profile 156 are less than the outer profile or perimeter 110 of the lens 102. The outer profile or perimeter 110 of the lens 102 can be considered to be less than anterior or posterior retention profiles 154, 156 if the given one of the anterior and posterior retention profiles 154, 156 is too small to allow passage of the lens 102 therethrough. In other words, the float profile 112 of the bed or lower surface of the groove 114 can be greater than a corresponding profile 110 of the lens 102. Further, the corresponding profile 110 of the lens 102 can be less than the retention profiles 154, 156 of the banks 150, 152 of the groove 114 such that the lens 102 is permitted to move within the groove 114 without disengaging from the groove 114.

The groove 114 can define a constant depth. However, it is also contemplated that the groove 114 can define a variable depth. In such embodiments, the configuration of the posterior and anterior banks 150, 152 of the groove 114 can be variously modified. Such variations can occur in order to reduce amount of material used in the eyeglass and to ensure desirable and mechanical properties.

In some embodiments, the anterior retention profile 154 and the posterior retention profile 156 can be identical. In a simple example, if an eyeglass used a simple planar, circular lens, both the anterior and posterior retention profiles could be circles having equal diameters. Nevertheless, in eyeglasses having more complex lens shapes, the anterior and posterior retention profiles can defined as a two-dimensional shape or outline as seen from a given point situated anteriorly or posteriorly relative to the eyeglass. In such embodiments, the anterior and posterior retention profiles can be identical or different. For example, the anterior and posterior retention profiles can be defined by a continuous curved profile (for example in FIG. 7) or by a profile having inwardly extending protrusions (for example in FIG. 12A).

It should be noted that a universal point of reference for assessing a given profile can be a point lying along a line that is geometrically normal to a center point of a surface defined by the shape or contours in question. However, it is also appreciated that one may attempt to remove the lens from the groove at any variety of anterior or posterior angles. Thus, the lens profile can be compared to the anterior or posterior retention profile from a point of view in the direction of a pulling or pushing force attempting to remove the lens from the groove.

Accordingly, in order to constrain a lens from anterior movement, the anterior retention profile should overlap with the lens, for example, the outer profile or perimeter of the lens, in the direction of the movement. Similarly, in order to constrain lens from posterior movement, the posterior retention profile should also overlap with the lens, for example, the outer profile or perimeter of the lens, in the direction of the movement.

Figure 10:
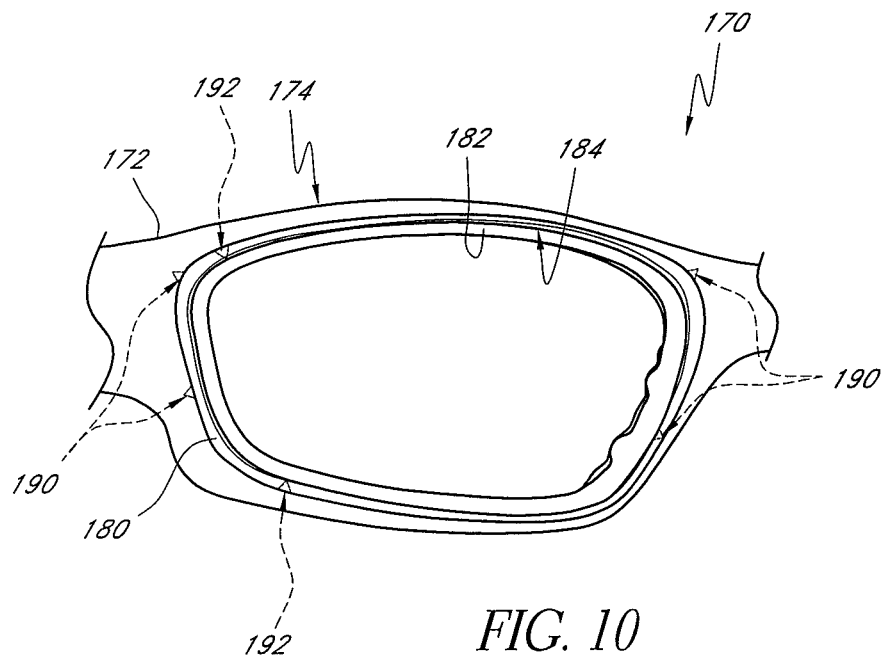
FIG. 10 is a partial front view of a frame of an eyeglass, according to an embodiment.

In some embodiments, one of the anterior and posterior retention profiles 154, 156 is configured to continuously overlap the lens, for examples, the outer profile or perimeter of the lens (see FIGS. 7 and 10). However, one of the anterior and posterior retention profiles 154, 156 may nevertheless serve to constrain the lens in an anterior-posterior direction even though the profile does not continuously overlap the lens (see FIGS. 11 and 12A).

Figure 11:
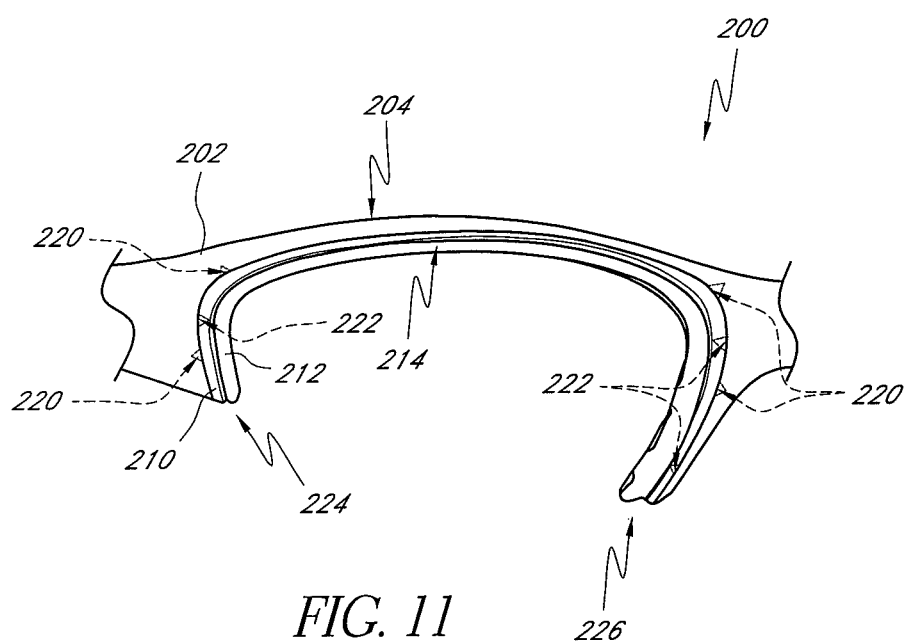
FIG. 11 is a partial front view of a frame of an eyeglass having a partial lens support or orbital, according to another embodiment.

FIGS. 10 and 11 illustrate embodiments of eyeglasses that can be utilized to support a lens and allow the lens to float relative to the frame of the eyeglass. FIG. 10 is a partial front view of an embodiment of an eyeglass 170 comprising a frame 172 having a lens support 174. The frame 172 can comprise a wire or nonwire frame. As illustrated, the lens support 174 can comprise an anterior portion 180 and a posterior portion 182. Similarly to the cross-sectional view of FIG. 9, the anterior portion 180 and the posterior portion 182 can define a recess or space 184 therebetween that is configured to receive and float a lens therein. In this embodiment, the lens support 174 can entirely peripherally surround a lens disposed therein.

In order to float the lens within the recess or space 184, the anterior portion 180 should be separated from the frame 172. Once the lens is disposed against the posterior portion 182, the anterior portion 180 can be coupled to the frame 172. The anterior portion 180 can be retained by the frame 172, such as by use of a snap or friction fit. Such a snap fit can be facilitated by the use of recesses and projections, which are labeled collectively as elements 190 in FIG. 10. As will be appreciated by one of skill in the art, projections extending from the anterior portion 180 can be received within the recesses of the frame 172. Accordingly, the anterior portion 180 can be attached to the frame 172 thereby enclosing a lens within the recess or space 184. It should also be noted that the recesses can be on the anterior portion and the projections can extend from the frame 172, as illustrated by elements 192.

In this regard, the anterior portion 180 can selectively be attached or removed from the frame 172 showed the wearer wish to interchange lenses or anterior portions of the eyeglass is 170. For example, the wearer can be provided with a variety of lenses as well as a variety of anterior portions, which can be of different colors, materials, sizes, etc. In this regard, the wearer can personalize the eyeglasses 170 by selectively substituting lenses or anterior portions. This interchangeability can be especially useful should a lens, anterior portion, or any other component be scratched or otherwise damaged.

As discussed above with respect to FIGS. 7-9, the embodiment illustrated in FIG. 10 can similarly provide for a floating lens system. The anterior portion 180 and the posterior portion 182 can also constrain movement of the lens in an anterior posterior direction.

Further, it is also contemplated that the anterior portion 180 can be permanently affixed to the frame 172 after the lens is disposed within the recess or space 184 defined by the anterior and posterior portions 180, 182. For example, the anterior portion 180 can be adhesively bonded or otherwise joined to the frame 172. Such bonding processes are known in the art and can be selected based on the material properties of the eyeglass 170, specifically whether the eyeglass 170 is formed from a polymer or metal. Accordingly, in contrast to other embodiments disclosed herein, the present embodiment can dispense with any need for a pivotal or hinge coupling of the anterior and posterior portions 180, 182 to the frame 172 if the anterior and posterior portions 180, 182 are permanently affixed thereto.

Referring now to FIG. 11, there is illustrated a partial front view of an embodiment of an eyeglass 200 comprising a frame 202 and a lens support 204. In this embodiment, the lens support 204 comprises a partial orbital which does not completely surround the lens (in this case, along the lower edge of the lens). The frame 202 can comprise a wire or nonwire frame. In contrast to FIG. 10, the eyeglass 200 illustrated FIG. 11 can only partially peripherally surround a lens disposed therein. However, the features of the eyeglass 200 are generally identical to those of the eyeglass 170. Specifically, the eyeglass 200 includes anterior and posterior portions 210, 212 that define a recess or space 214 therebetween. As similarly discussed above, the anterior portion 210 can be removably or permanently attached to the frame 202. Such attachment can be facilitated by the use of recesses and protrusions 220, 222. As such, the disclosure above with respect FIG. 7-9 and to the attachment between the anterior portion 180 and the frame 172 will not be repeated here, but similarly applies to the anterior portion 210 and the frame 202 and can be referred to for such information.

As with the embodiment illustrated FIG. 10, a lens supported by the eyeglass 200 can also float relative to the frame 202. Further, it is noteworthy that although a lens supported by the eyeglass 200 is not completely peripherally surrounded by the frame 202, lateral and medial sections 224, 226 of the frame 202 extend along a lower portion of the lens and converge toward each other, such that the lens cannot slide downwardly out of the recess or space 214. As such, an eyeglass can be provided in which a bottom edge of a lens is exposed and in which the lens floats and therefore provides superior optical quality because it does not experience compressive stresses.

Figure 12A:
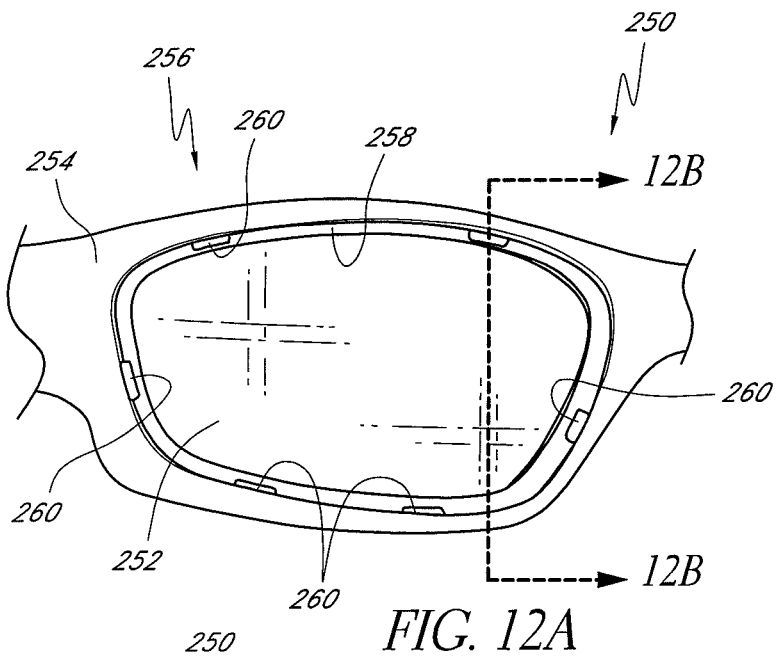
FIG. 12A is a partial front view of a frame of an eyeglass, according to yet another embodiment.
Figure 12B:
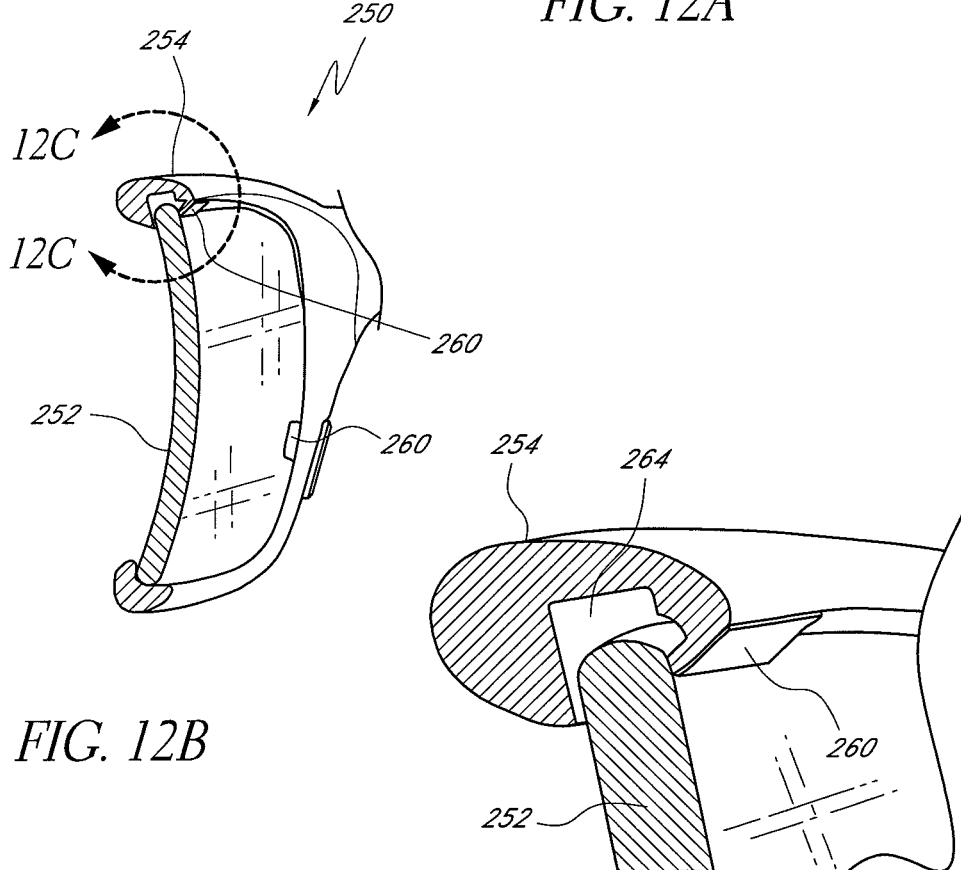
FIG. 12B is a side cross-sectional view of the frame of FIG. 12A, taken along Section 12B-12B and illustrating a lens supported by the frame.
Figure 12C:
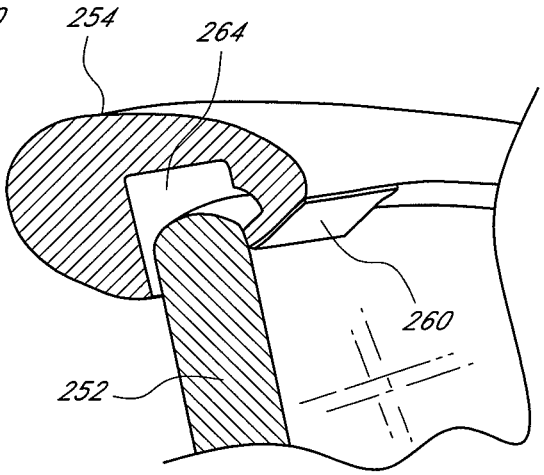
FIG. 12C is an enlarged side cross-sectional view of the frame and lens of FIG. 12A, taken along Section 12C-12C of FIG. 12B.

FIGS. 12A-C illustrate another embodiment of an eyeglass 250 comprising a lens 252, a frame 254, and a lens support 256. The frame 254 can comprise a wire or nonwire frame. The lens support 256 can comprise a posterior section 258 and an anterior section 260. The anterior section 260 can comprise a plurality of resilient tabs or support members that are spaced about the periphery of the lens support 256, as shown in FIG. 12A. The tabs or support members can be flexible and move between a retaining position (as shown in FIG. 12C), in which the lens 252 is retained by the lens support 256, and an open position, in which the lens 252 can be removed or introduced into the lens support 256.

FIG. 12B illustrates that the lens 252 can float relative to the frame 254. However, in contrast to the embodiments discussed above, the eyeglass 250 can be configured to permit the lens 252 to be received into the lens support 256 and retained therein by means of the resilient tabs of the anterior section 260. In this regard, it is contemplated that the tabs of the anterior section 260 can allow the lens 252 to be removably mounted into the lens support 256. Thus, the lens 252 can be mounted in the eyeglass 250 and flow to within a lens mounting area or groove 264 of the frame 254 or lens support 256.

FIGS. 13-18C illustrate a variety of views of an eyeglass or eyeglass frame 300 in accordance with yet another embodiment. The eyeglass frame can be formed as a dual lens frame. However, it is contemplated that many of the features discussed herein can also be used in a unitary lens embodiment. As will be discussed in further detail below, the eyeglass frame 300 can advantageously maintain an as-molded geometry of a lens. The frame 300 can comprise a lens mounting area or lens groove that is configured to at least partially receive the lens, as well as a frame portion and at least one support member. The support member can be moveable relative to the frame portion to provide access to the groove in an open position and to retain the lens laterally within the groove in a closed position. In the closed position, the frame portion and the support member secure the lens within the groove without exerting deformative force of the lens. Additionally, some embodiments can comprise one or more of the lens bumper features discussed herein.

Figure 13:
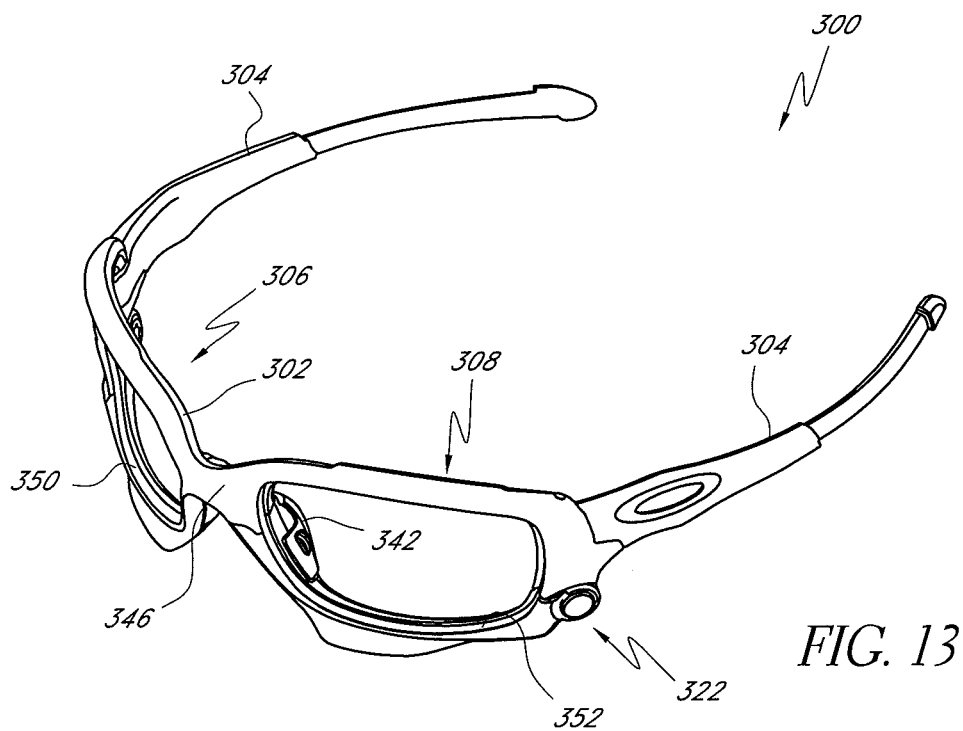
FIG. 13 is a perspective view of an eyeglass frame, according to an embodiment.

Referring now to the embodiment shown in FIGS. 12-13, the eyeglass frame 300 can comprise a frame portion 302 and opposing ear stems 304. The frame portion 302 can comprise a wire or nonwire frame. In addition, the frame portion 302 can comprise first and second lens supports 306, 308 that are configured to support a respective lens in the path of a wearer's field of view. The first lens support 306 can comprise a first jaw or support member 310. The second lens support 308 can comprise a second jaw or support member 312.

The first and second support members 310, 312 can each define first and second ends 316, 318. The first ends 316 can be attached, formed with, or coupled to a portion of the frame portion 302. In some embodiments, the first and second support members 310, 312 and the frame portion 302 can define lens mounting areas or grooves in which the lenses can be mounted. In the illustrated embodiment, the first and second support members 310, 312 are pivotally attached or coupled to the frame portion 302. However, it is contemplated that the first and second support members 310, 312 can be monolithically formed with the frame portion 302 and configured to pivot, move, or deflect with respect to the frame portion 302.

Figure 18A:
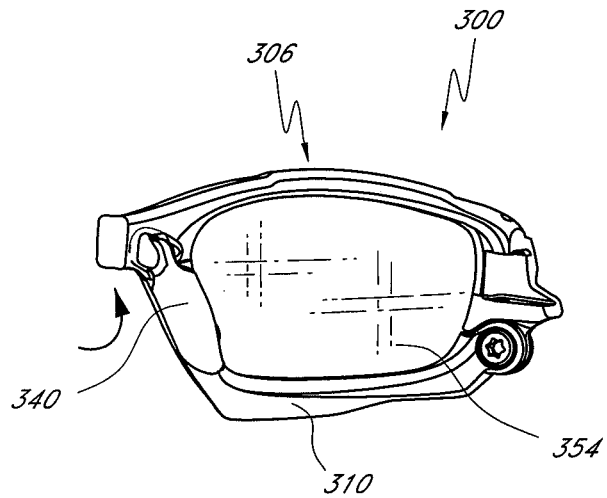
FIGS. 18A-C illustrate the opening of a latch of the eyeglass frame of FIG. 13 and removal of a lens therefrom, according to an embodiment.
Figure 18B:
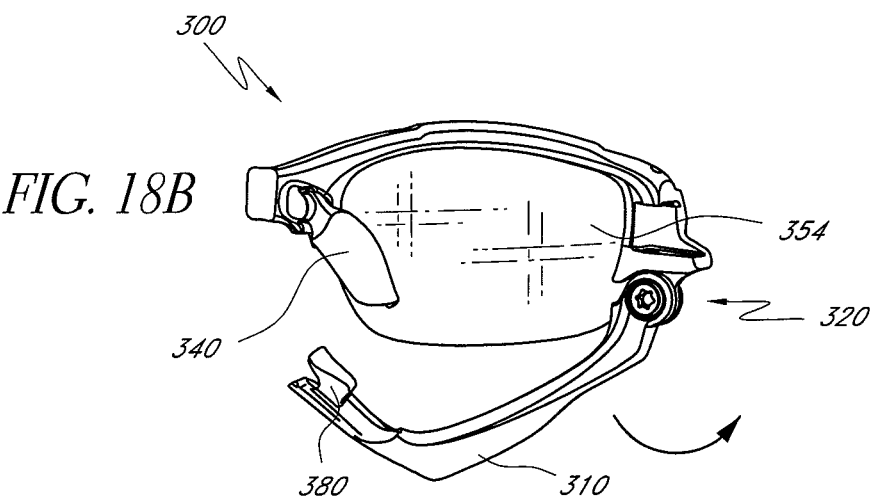

As such, the first and second support members 310, 312 and the frame portion 302 can be formed by processes such as those described further herein. Additionally, the second ends 318 of the first and second support members 310, 312 can be free ends that move relative to the frame portion 302. The first and second support members 310, 312 can move between retaining and open positions (for example, as shown in FIGS. 18A and 18B). In the retaining position, the free ends 318 can be fixed relative to the frame portion 302. The retaining position can allow the first and second support members 310, 312 and the frame portion 302 to capture at least a portion of the perimeter of the lens for mounting the lens in the path of the wearer's field of view. In this regard, the retaining position can be achieved when the free ends 318 attach to or abut a portion of the frame portion 302, such as a bridge thereof.

As noted above, the first and second frame members 310, 312 can be pivotally attached to the frame portion 302. For example, the eyeglass frame 300 can comprise first and second joints 320, 322 at which the respective ones of the first and second support members 310, 312 pivotally attached to first and second lateral ends 324, 326 of the frame portion 302. In order to attach the first and second frame members 310, 312 to the respective ones of the first and second lateral ends 324, 326 of the frame portion 302, a fastener 330, such as a bolt or screw can be used.

In addition, the eyeglass 300 can comprise first and second securing members 340, 342. In some embodiments, the first and second securing members 340, 342 can be attached to a medial portion of the frame. However, it is contemplated that the first and second securing members 340, 342 can also be attached to a lateral portion of the frame. In the illustrated embodiment of FIGS. 13-14, the first and second securing members 340, 342 are shown as being pivotally attached to a posterior area of a bridge portion 346 of the frame portion 302. Further, as illustrated in FIGS. 15, 16B, 17A and 18A-C, the securing members 340, 342 can be configured to act as nosepiece components that support the frame on the wearer's nose. This clever incorporation of form, function, and comfort provide one of the many advantages of the embodiments discussed herein.

In some embodiments, the securing members 340, 342 can be monolithically formed with the eyeglass 300 or separately formed as individual components and configured to pivot, move, or deflect with respect to the eyeglass 300. As discussed below, the first and second securing members 340, 342 can be pivotable, deflectable, or movable between an engaged position and a disengaged position in order to secure the support members 310, 312 in the retaining position for securing the support members 310, 312 to the frame.

For example, the first and second securing members 340, 342 can comprise latches for restricting or permitting rotational movement of the first and second frame members 310, 312 about the first and second joints 320, 322. Similar to the securing members, the latches can be monolithically formed with the eyeglass 300 or separately formed as individual components and configured to pivot, move, or deflect with respect to the frame 300. Further, it is contemplated that the securing members or latches can be monolithically formed with the first and second support members 310, 312 so as to enable the first and second support members 310, 312 to snap or friction fit onto the frame. In other words, some embodiments of the frame can be configures without separate securing member or latches, and the first and second support members can be configured to engage the frame in a manner that allows the first and second support members to be fixed relative to the frame.

Figure 14:
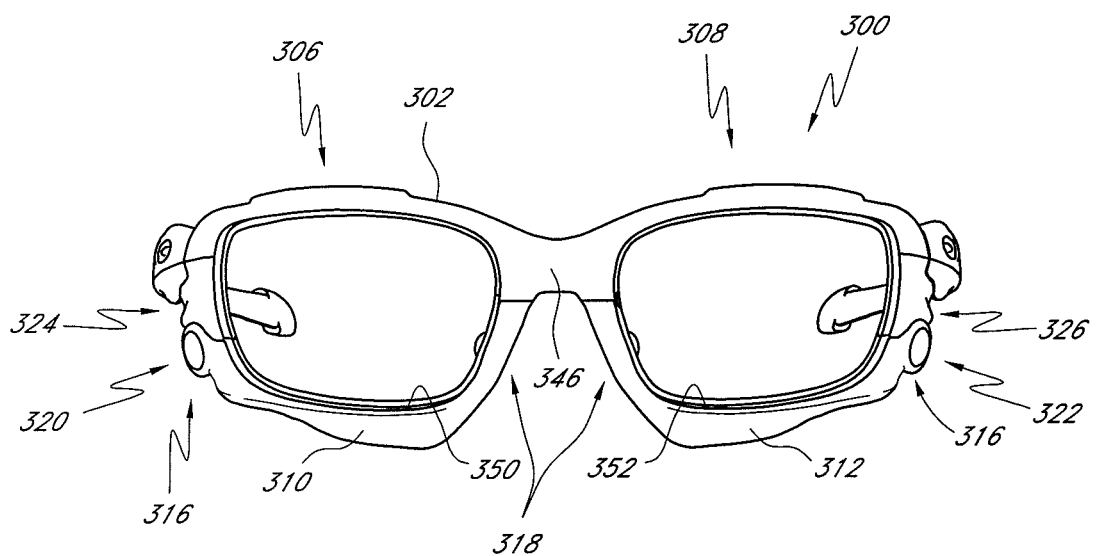
FIG. 14 is a front view of the eyeglass frame of FIG. 13.

The securing members 340, 342 can be configured to engage the free ends 318 of the support members 310, 312 for securing the free ends 318 of the support members 310, 312 relative to the frame. When the first and second securing members 340, 342 are in an engaged position, as illustrated in FIGS. 13, 14, and 16B, the respective one of the first and second frame members 310, 312 is locked in place. In this regard, a lens received within one of the first and second lens mounting areas or grooves 350, 352 cannot be removed therefrom if the respective one of the first and second securing members 340, 342 is in its engaged position.

Furthermore, it should be noted that when the first and second securing members 340, 342 are in an engaged position, the first and second securing members 340, 342 form an ergonomic and comfortable nosepiece component that allows the wearer to use the eyeglass is 300. However, if one of the first and second securing members 340, 342 are in an open or disengaged position, that nosepiece member will protrude from the nosepiece component, thus making use of the eyeglass is 300 uncomfortable. As such, it is anticipated that the wearer can quickly ascertained whether the first and second securing members 340, 342 are properly in an engaged position before using the eyeglass 300.

As illustrated in FIGS. 13-15, the frame section 302 and the respective ones of the first and second frame members 310, 312 define the first and second lens supports 306, 308. As discussed above with respect to the embodiment of FIGS. 7-9, the first and second lens supports 306, 308 each define respective first and second grooves 350, 352 which can be configured to receive a lens therein, as illustrated with first and second lenses 354, 356 and FIG. 15. Accordingly, the above discussion regarding FIGS. 7-9, which will not be repeated here, similarly applies to the present embodiment and is incorporated into the present discussion. In each of these embodiments, the frame can be configured such that the frame and the support member, frame member, jaw, or lens support can define a rigid enclosure into which a lens can be received. The rigid enclosure can be configured to retain the lens without exerting deformative forces on the lens.

Figure 16A:
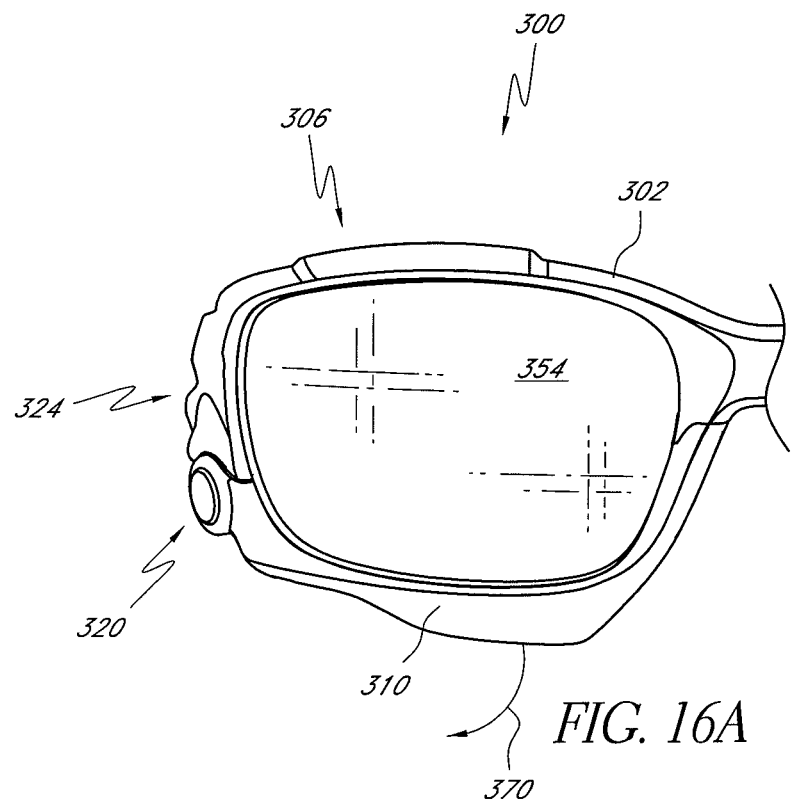
FIG. 16A is a partial front view of an eyeglass incorporating the eyeglass frame of FIG. 13, according to an embodiment.
Figure 16B:
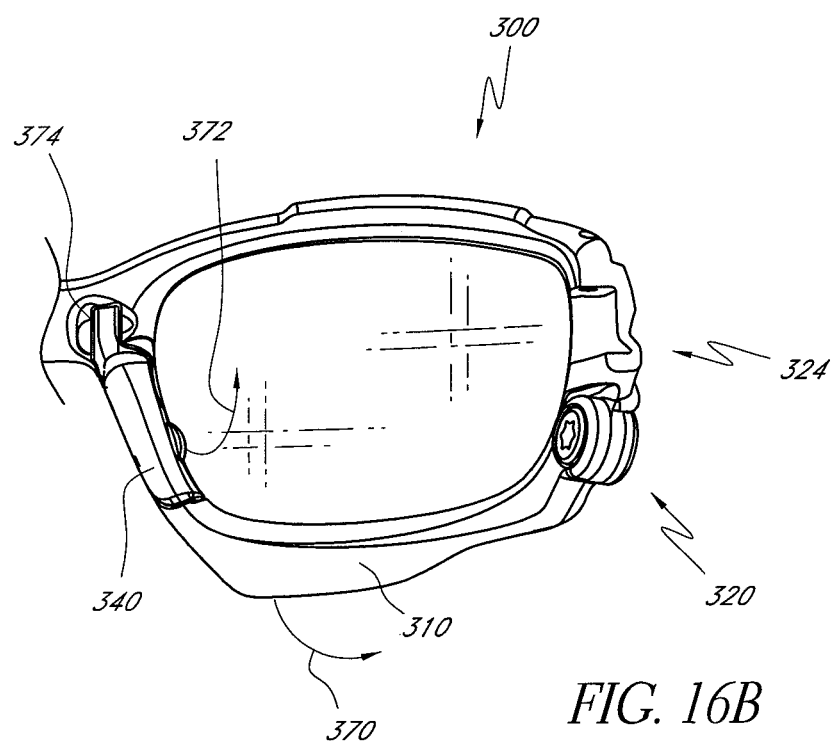
FIG. 16B is a partial rear view of the eyeglass illustrated in FIG. 16A.

Referring now to FIGS. 16A-B, partial front and rear views of the eyeglass 300 are illustrated. As illustrated therein, arrow 370 indicates the direction of rotation of the first frame member 310 about the first joint 320. In order to open the first frame member 310, as noted above, the first securing member 340 can be rotated in the direction of arrow 372. As illustrated, the securing member 340 can comprise a pivot 374 that allows the first securing member 340 to rotate from the engaged position to an open or disengaged position. As illustrated, the securing members (or in some embodiments, the latches) can pivot in a medial-lateral direction with respect to the frame.

Figure 17A:
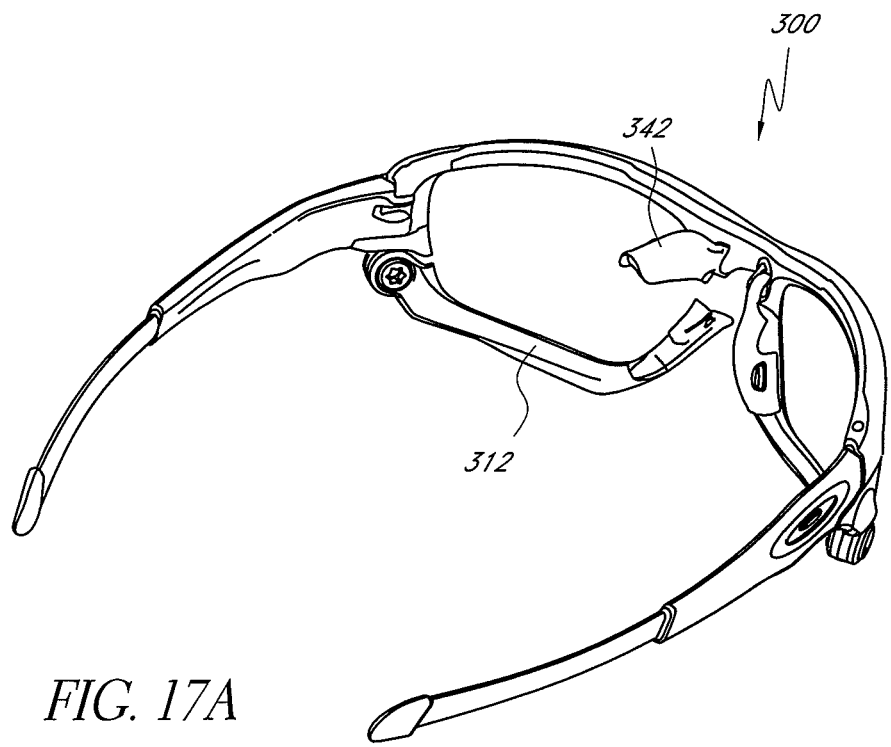
FIG. 17A is a rear perspective view of the eyeglass frame of FIG. 13 in an open configuration, according to an embodiment.
Figure 17B:
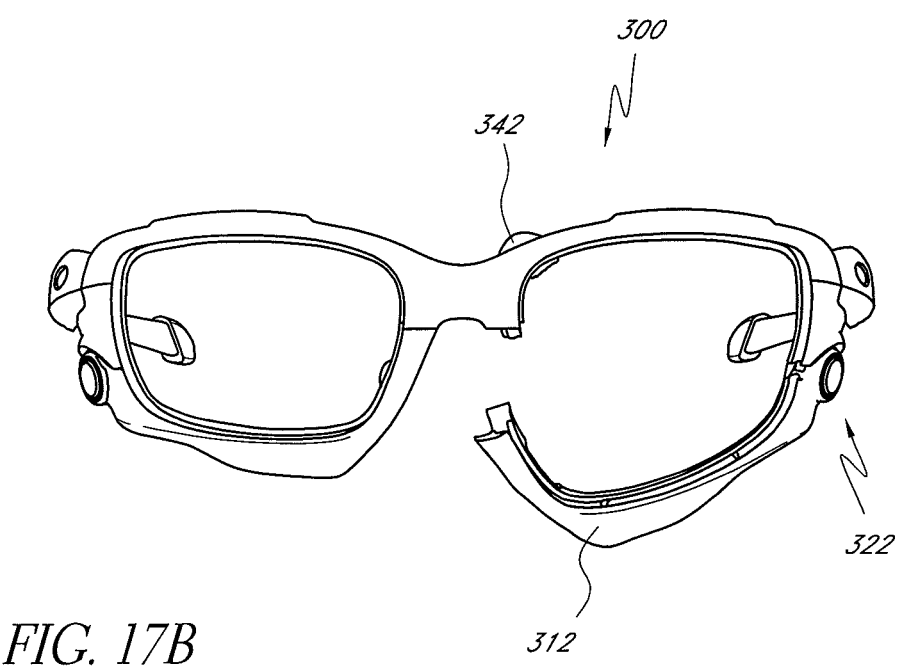
FIG. 17B is a front view of the eyeglass frame as shown in FIG. 17A.
Figure 18C:
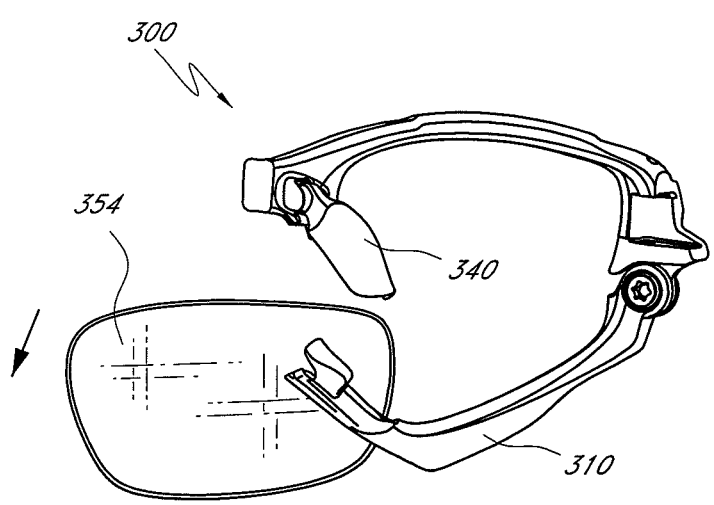

FIGS. 17A-B show the second frame member 312 in an open position after the second securing member 342 has been moved to the disengaged position. FIGS. 18A-C illustrate the steps of removing the first lens 354 from the first line support 306. FIG. 18A illustrates the second support member 312 in an initial retaining position. As shown, the first securing member 340 can first be rotated from its engaged position to a disengaged position, as shown in FIG. 18A. In this regard, it is noted that in the illustrated embodiment, the first securing member 340 is configured to be rotated in an anterior-posterior direction. Additionally, this rotational movement allows the first securing member 340 to engage a medial portion 380 of the first frame member 310.

Next, as shown in FIG. 18B, the first frame member 310 can be rotated downwardly about the first joint 320 to an open position, thus opening the first lens support 306. Once the first lens support 306 is open, the first lens 354 can be removed therefrom. Thus, in such embodiments, the lens 354 can be mounted and removed without bending or distorting the lens 354 to fit into the groove. As such, the eyeglass 300 provides a quick and easy method of interchanging the lenses thereof. Further, when the frame member 310 is in the open position, the securing member 340 can be further rotated upwardly and can be disconnected or removed from the frame without the use of any tools. Such a feature can also be implemented in other embodiment incorporating movable latch nosepieces, thus allowing interchangeability of the nosepieces. This interchangeability can allow for customized fitting of the eyeglass for wearers having different nasal geometries.

Figure 19A:
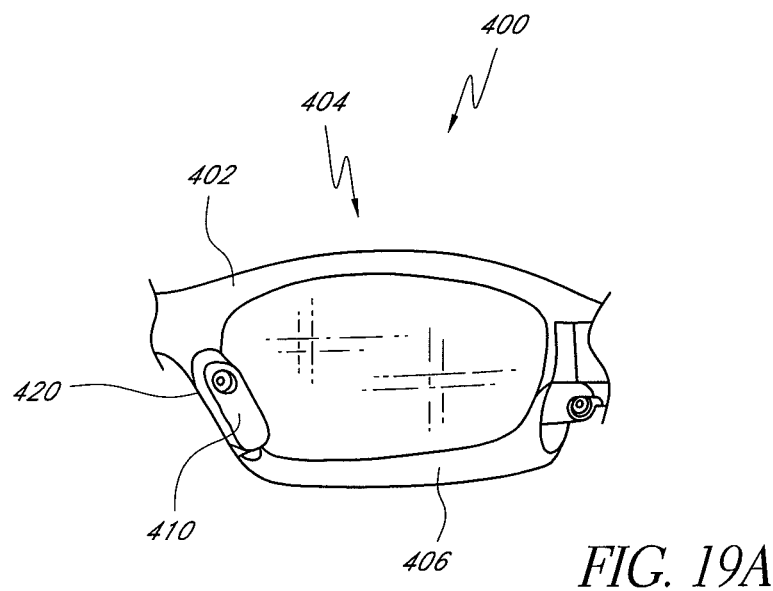
FIGS. 19A-B illustrate the opening of a latch of another embodiment of an eyeglass frame.
Figure 19B:
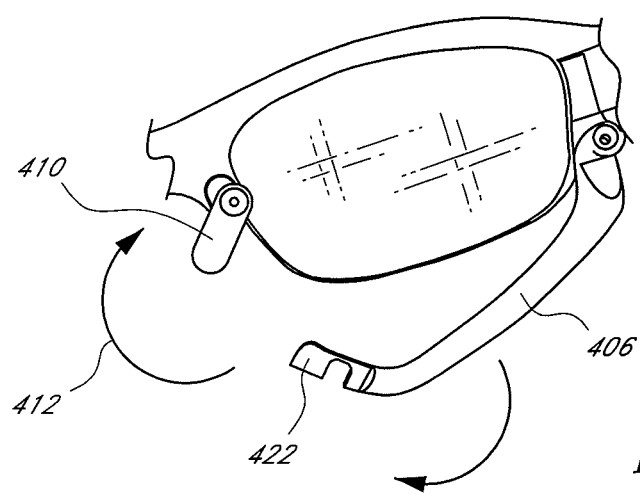

Additionally, FIGS. 19A-B provide a partial rear view of another embodiment of an eyeglass 400 comprising a frame portion 402, a lens support 404, and a jaw or support member 406 that is pivotally coupled to the frame portion 402. The frame portion 402 can comprise a wire or nonwire frame. Accordingly, the above discussion regarding FIGS. 7-9, which will not be repeated here, similarly applies to the present embodiment and is incorporated into the present discussion. In contrast to the embodiment illustrated in FIGS. 18A-B, the eyeglass 400 comprises a nosepiece member 410 that rotates in a medial-lateral direction, as illustrated by the arrow 412.

As illustrated in FIG. 19B, the nosepiece member 410 can rotate inwardly toward an opposing nosepiece member or toward the nosepiece area. Accordingly, entering an engaged position, as shown in FIG. 19A, medial section 420 of the nosepiece member 410 can engage a medial end to 422 of the frame member 406, being urged in a medial-lateral direction toward the ear stems of the eyeglass 400. In this regard, an advantage of this embodiment is that normal use of the eyeglass 400 can tend to ensure that the nosepiece members stay in an engaged position during use.

Figure 20A:
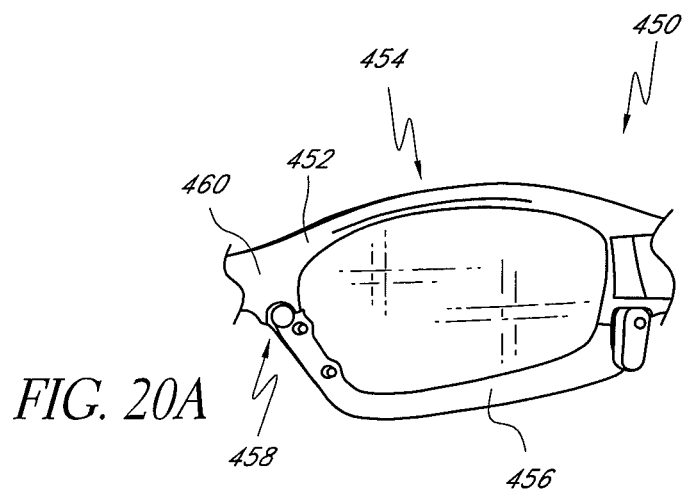
FIGS. 20A-C illustrate yet another embodiment of an eyeglass frame and the opening of a latch thereof in order to remove a lens therefrom.
Figure 20B:
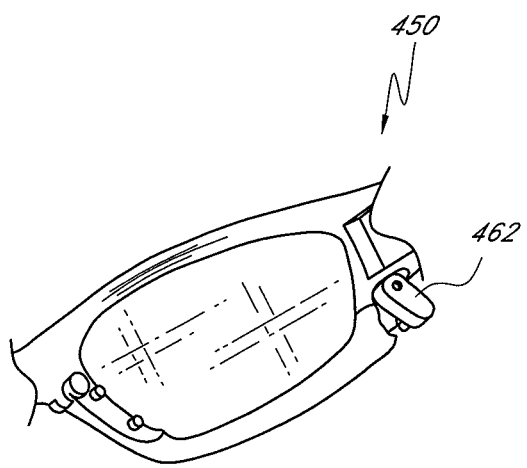
Figure 20C:
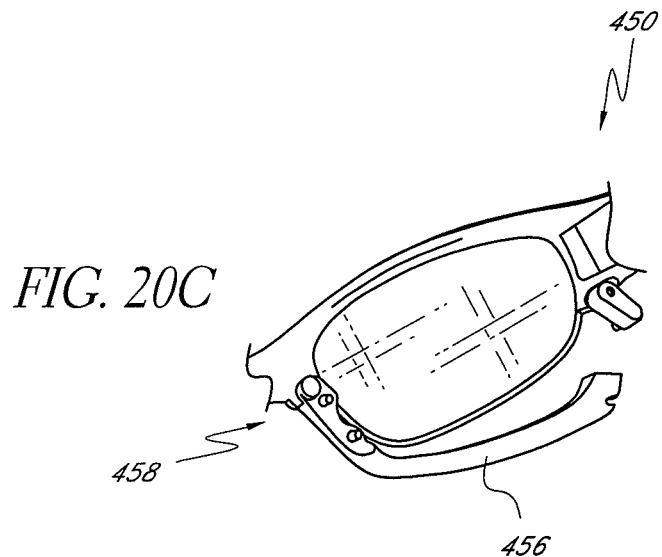

FIGS. 20A-C provide a partial rear view of yet another embodiment of an eyeglass 450 comprising a frame portion 452, a lens support 454, and a jaw or support member 456 that is pivotally attached to the frame portion 452. The frame portion 452 can comprise a wire or nonwire frame. Accordingly, the above discussion regarding FIGS. 7-9, which will not be repeated here, similarly applies to the present embodiment and is incorporated into the present discussion. However, in contrast to the embodiments illustrated in FIGS. 18A-19B, the frame member 456 rotates about a joint 458 disposed adjacent to a nosepiece section 460 of the frame portion 452.

As shown in FIGS. 20B-C, a securing member 462 can be rotated to a disengaged position in order to allow the frame member 456 to rotate freely about the joint 458. The securing member 462 can be a latch in some embodiments. The direction of rotation as illustrated can facilitate the quick removal of lenses by the wearer. Further, inadvertent disengagement of the securing member 462 will not tend to result in opening of the lens support 454 during use because the frame member 456 will be biased against the wearer's nose and therefore impeded from opening.

Figure 21A:
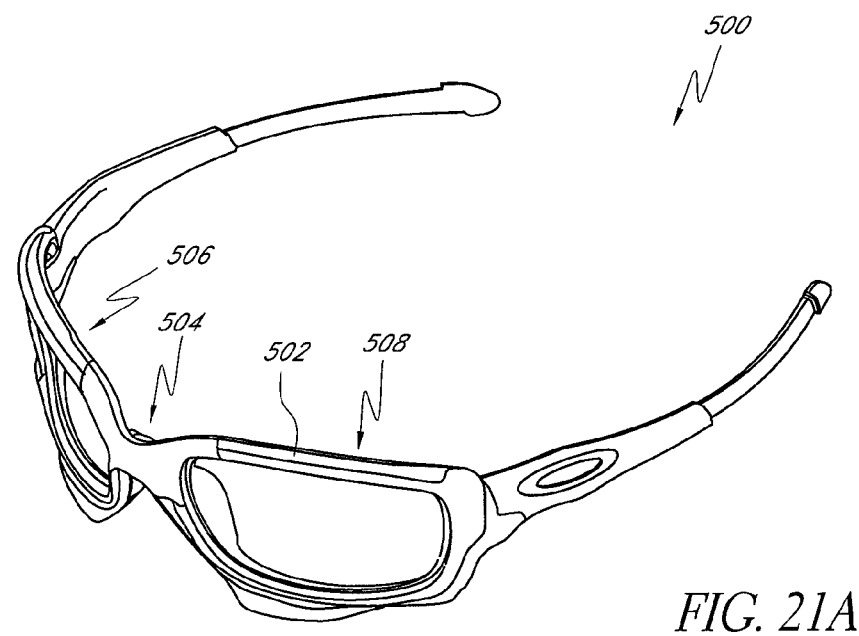
FIGS. 21A-C illustrate yet another embodiment of an eyeglass frame adapted to removably receive at least one lens.
Figure 21B:
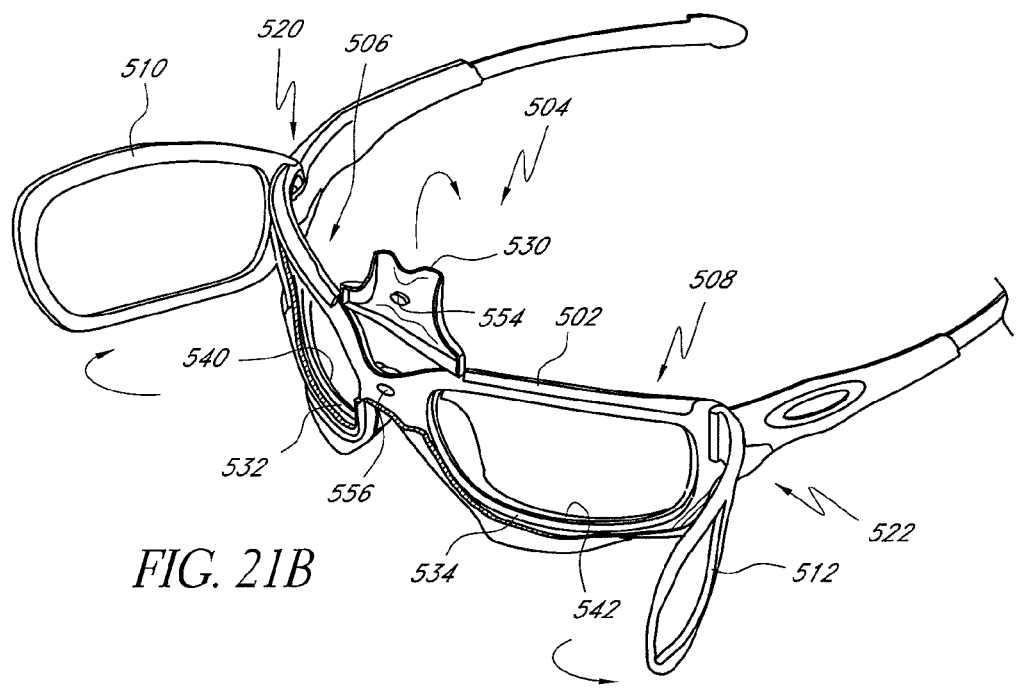
Figure 21C:
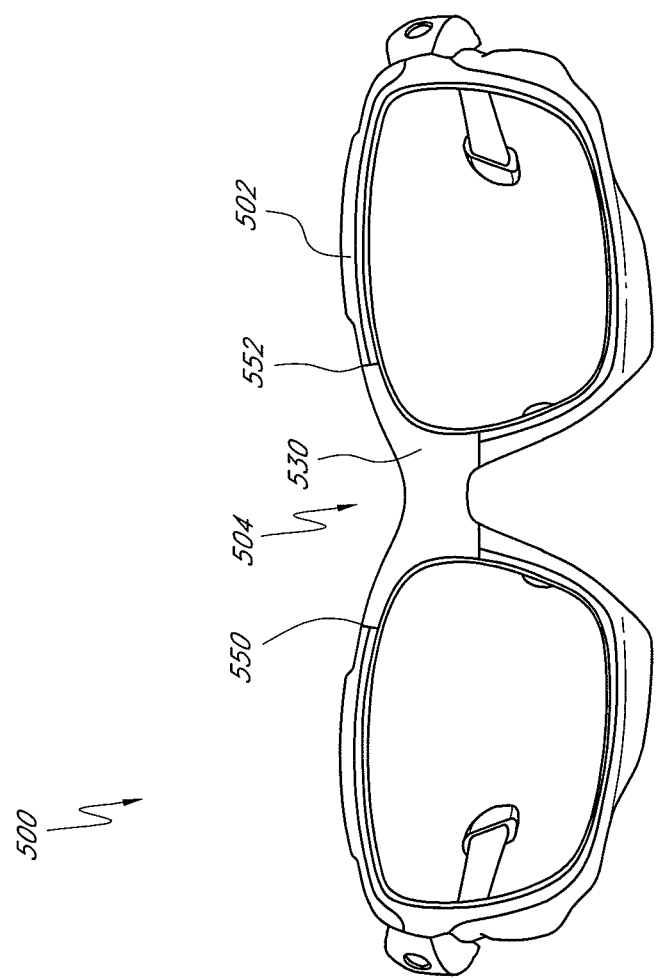

Referring now to FIGS. 21A-C, yet another embodiment of an eyeglass frame is provided for floating a lens. FIG. 21A is a perspective view of the eyeglass frame 500 comprising a frame portion 502, a nosepiece section 504, and first and second lens supports 506, 508. The frame 502 can comprise a wire or nonwire frame. The first and second lens supports 506, 508 are uniquely configured to comprise respective first and second anterior portions 510, 512 that are pivotally attached to respective first and second lateral ends 520, 522 of the frame portion 502.

In this regard, the first and second anterior portions 510, 512 can nest with the frame portion 502, as shown in FIG. 21A to provide a sleekly contoured eyeglass. However, these first and second anterior portions 510, 512 can be separated from the frame portion 502 by first lifting or rotating upwardly a securing member 530 of the nosepiece section 504. Once the securing member 530 is moved from an engaged to a disengaged position, as shown in FIG. 21B, the first and second anterior portions 510, 512 can be rotated about the respective ones of the first and second lateral ends 520, 522, thus opening the respective first and second lens supports 506, 508. In some embodiments, it is contemplated that the first and second anterior portions 510, 512 and/or the securing member 530 can be monolithically formed with the frame portion 502 and configured to pivot, move, or deflect with respect to the frame portion 502. Such a monolithic embodiment is similar to the other monolithic embodiments disclosed herein, and thus, further details will not be repeated for sake of brevity.

As shown in FIG. 21B, when the first and second anterior portions 510, 512 are moved to an open position, first and second recesses or spaces 532, 534 are thereby exposed. The first and second recesses or spaces 532, 534 extend about respective peripheries of the first and second lens supports 506, 508. Although not shown, lenses can be inserted into the first and second recesses or spaces 532, 534. As with the other embodiments discussed herein, the lenses inserted into the first and second recesses or spaces 532, 534 can be floated therein in order to reduce and/or eliminate compression stresses and to ensure superior optical performance. Accordingly, the above discussion regarding FIGS. 7-9, which will not be repeated here, similarly applies to the present embodiment and is incorporated into the present discussion.

The first and second anterior portions 510, 512 can advantageously be configured to open towards an anterior face of the eyeglass frame 500. In this regard, first and second posterior portions 540, 542 of the eyeglass frame 500 can provide protection against impact. In other words, because the frame portion 502 can be monolithically formed with the first and second posterior portions 540, 542, any blunt impact against either of the lenses will have little effect against the eyeglass frame 500.

The securing member 530 of the nosepiece section 504 can be pivotally attached to first and second medial points 550, 552 of the frame portion 502, as shown in FIG. 21C. For example, the securing member 530 can be configured as a latch. The securing member 530 can be configured to capture and secure at least a portion of the medial sections of the first and second anterior portions 510, 512 in the closed position. Further, as shown in FIG. 21B, the securing member 530 can comprise a protrusion 554 that makes with a corresponding recess 556 in the nosepiece section 504 in order to secure the securing member 530 in a closed position during use.

Figure 22A:
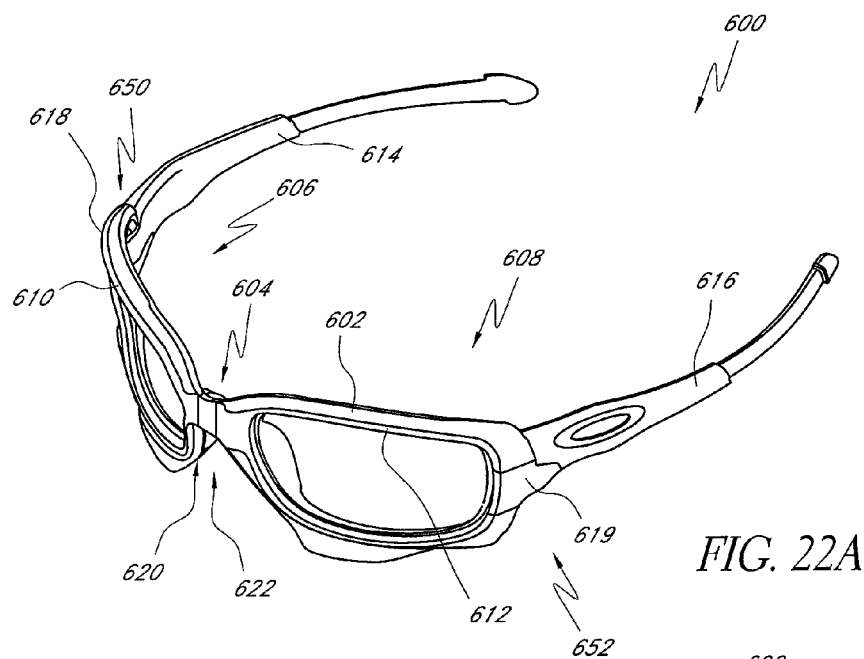
FIGS. 22A-C illustrate a further embodiment of an eyeglass frame adapted to removably receive at least one lens.
Figure 22B:
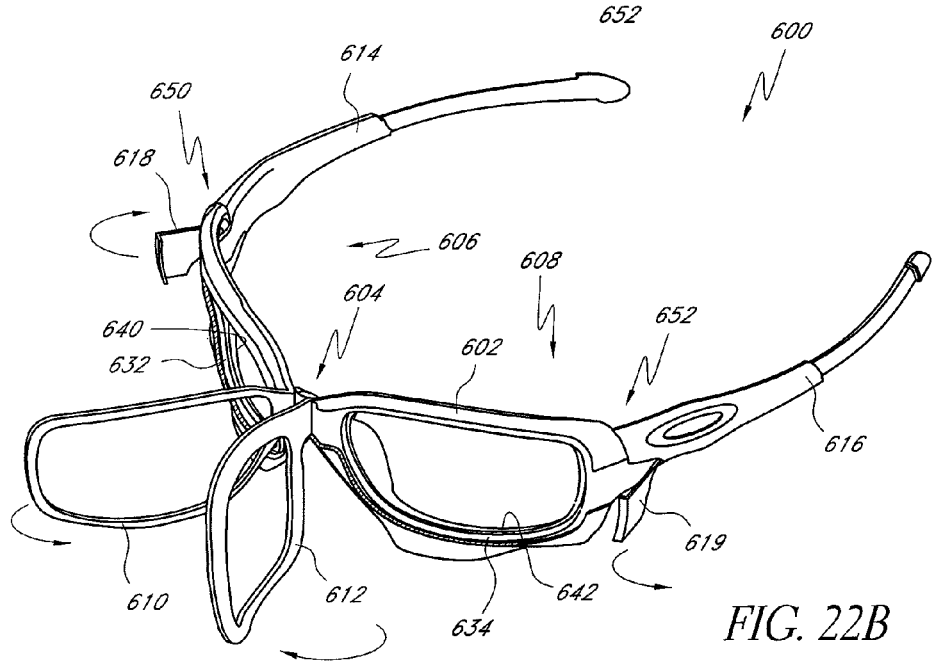
Figure 22C:
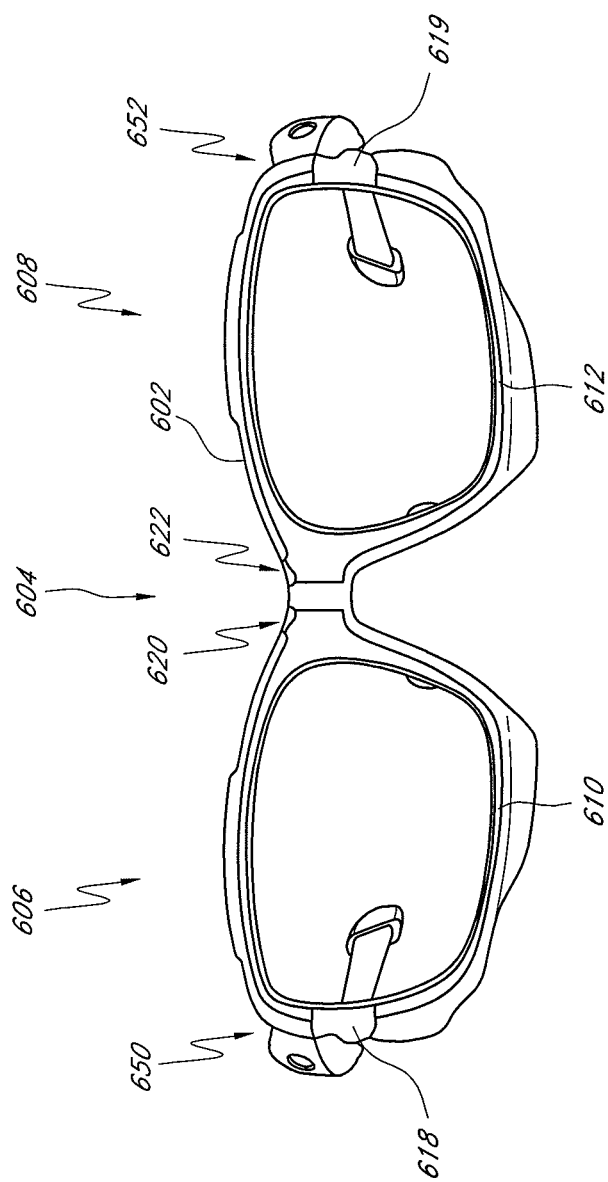

Referring now to FIGS. 22A-C, another embodiment of an eyeglass frame is provided for floating a lens. FIG. 22A is a perspective view of the eyeglass frame 600 comprising a frame portion 602, a nosepiece section 604, and first and second lens supports 606, 608. The frame portion 602 can comprise a wire or nonwire frame. The first and second lens supports 606, 608 are uniquely configured to comprise respective first and second anterior portions 610, 612 that are pivotally attached at respective first and second medial ends 620, 622 to the nosepiece section 604 of the frame portion 602. In the illustrated embodiment, the first and second anterior portions 610, 612 can attach to a medial area of the eyeglass frame 600, but it is contemplated that in other embodiments, the anterior portions 610, 612 can be pivotally attached to upper, lower, or lateral areas of the frame 600. Further, the eyeglass frame 600 can comprise first and second here stems 614, 616 and first and second securing members 618, 619. The securing members 618, 619 can be configured as latches. In some embodiments, it is contemplated that the first and second anterior portions 610, 612 and/or the securing members 618, 619 can be monolithically formed with the frame portion 602 and configured to pivot, move, or deflect with respect to the frame portion 602. Such a monolithic embodiment is similar to the other monolithic embodiments disclosed herein, and thus, further details will not be repeated for sake of brevity.

The first and second anterior portions 610, 612 can nest with the frame portion 602, as shown in FIG. 22A to provide a sleekly contoured eyeglass. However, these first and second anterior portions 610, 612 can be separated from the frame portion 602 by first moving the first and second ear stems 614, 616 towards a collapsed position and then rotating the first and second securing members 618, 619 about their vertical axis to release the lateral ends of the first and second anterior portions 610, 612.

Once the first and second securing members 618, 619 have been moved from an engaged to a disengaged position, as shown in FIG. 22B, the first and second anterior portions 610, 612 can be rotated about the respective ones of the first and second medial ends 620, 622, thus opening the respective first and second lens supports 606, 608.

As shown in FIG. 22B, when the first and second anterior portions 610, 612 are moved to an open position, first and second recesses or spaces 632, 634 are thereby exposed. The first and second recesses or spaces 632, 634 extend about respective peripheries of the first and second lens supports 606, 608. Although not shown, lenses can be inserted into the first and second recesses or spaces 632, 634. As with the other embodiments discussed herein, the lenses inserted into the first and second recesses or spaces 632, 634 can be floated therein in order to reduce and/or eliminate compression stresses and to ensure superior optical performance. Accordingly, the above discussion regarding FIGS. 7-9, which will not be repeated here, similarly applies to the present embodiment and is incorporated into the present discussion.

The first and second anterior portions 610, 612 can advantageously be configured to open towards an anterior face of the eyeglass frame 600. In this regard, first and second posterior portions 640, 642 of the eyeglass frame 600 are therefore reserved for providing protection against impact. In other words, because the frame portion 602 can be monolithically formed with the first and second posterior portions 640, 642, any blunt impact against either of the lenses will have little effect against the eyeglass frame 600.

The first and second securing members 618, 619 can be pivotally attached to the eyeglass 600 adjacent to hinge portions 650, 652, as shown in FIGS. 22A-C. In this regard, it is contemplated that the first and second securing members 618, 619 can pivot about the same pivot point as the respective ones of the first and second ear stems 614, 616. The first and second securing members 618, 619 can be configured to capture and secure at least a portion of the lateral sections of the first and second anterior portions 610, 612 in the closed position.

The embodiment illustrated in FIGS. 13-22C can also provide first and second lens mounting areas or grooves that are formed along an interior perimeter of the respective support members and the frame portion. As similarly detailed above, the first and second grooves can define opposing banks and a bed disposed intermediate the opposing banks. The bed can define a float profile, and the opposing banks can each define respective retention profiles. The float profiles of the beds can be greater than corresponding profiles of the lenses, and the corresponding profiles of the lenses can be less than the retention profiles of the banks of the grooves such that the first and second lenses are permitted to move within the respective first and second grooves without disengaging from the groove.

Figure 23:
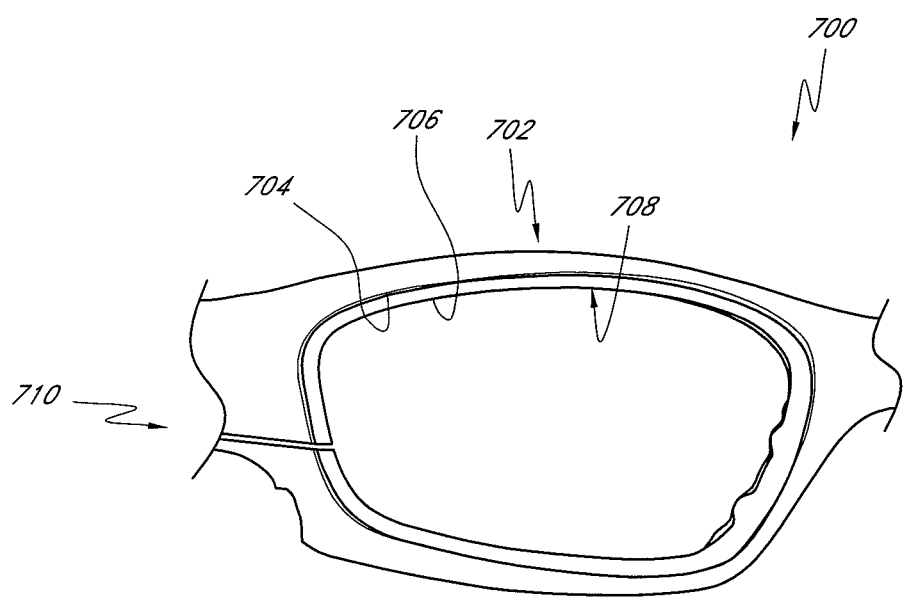
FIG. 23 is a partial front view of an eyeglass frame comprising a micro-gap, according to yet another embodiment.

Referring now to FIG. 23, a partial front view of yet another embodiment of an eyeglass frame 700 is illustrated. As shown therein, the eyeglass frame 700 can comprise a frame portion 702 and anterior and posterior portions 704, 706 configured to support a lens within a lens mounting area or groove 708 of the frame portion 702. The frame portion 702 can comprise a wire or nonwire frame. As discussed above with respect to FIGS. 7-9, the groove 708 can be configured to float a lens therein. Therefore, the discussion of such features above can be similarly applied in the present embodiment, and will not be repeated here, but the above text can be referred to for additional information with regard to the frame 700.

In contrast to the above embodiments, the eyeglass frame 700 shown in FIG. 23 comprises a micro gap 710 along a lateral portion 712 of the frame 700. The micro gap can create a living hinge that enables the lens support 702 to be opened and closed in order to interchange lenses. In this regard, it is contemplated that the micro gap 710 can be a split between upper and lower portions of the lens support 702. Additionally, it is contemplated that at least the lens support 702 can be manufactured from a resilient material that allows for repeated loading while ensuring that the micro gap 710 is maintained as narrow as possible when in a closed position.

Figure 24A:
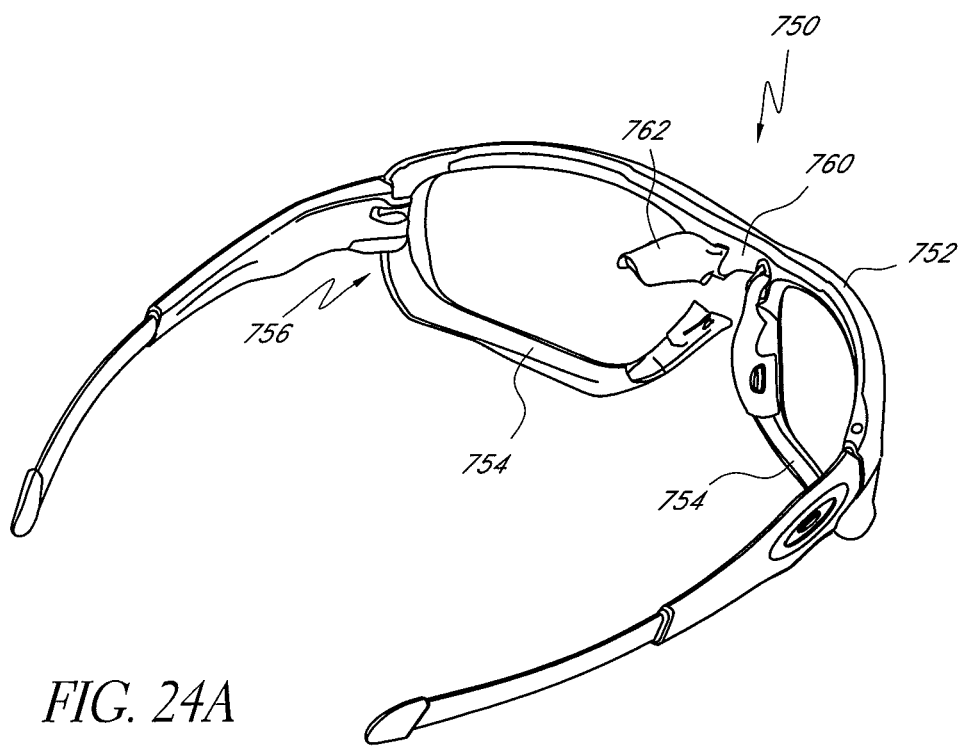
FIGS. 24A-B illustrate yet another embodiment of an eyeglass frame having a frame portion and a support member.
Figure 24B:
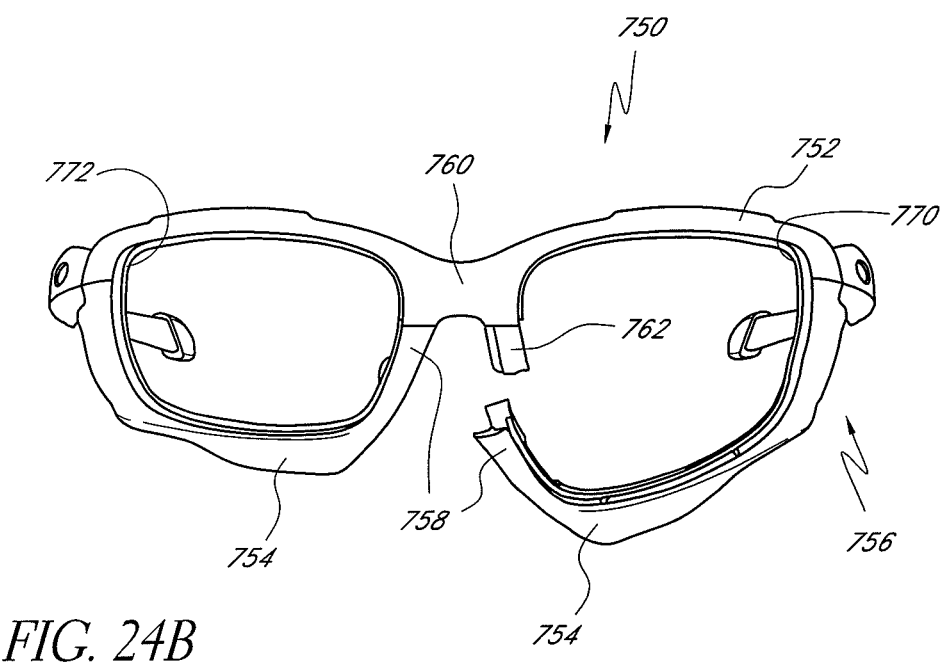

In other embodiments, such as illustrated in FIGS. 24A-B, an eyeglass can be provided that comprises an eyeglass frame 750 having a frame portion 752 and a support member 754. The frame 750 can be configured with the frame portion 752 and the support member 754 being formed monolithically or continuously with each other and configured such that the support member 754 can pivot, move, or deflect with respect to the frame portion 752. As will be discussed in further detail below, the eyeglass frame 750 can advantageously maintain an as-molded geometry of a lens. In addition to the frame portion 752 and the support member 754, the frame 750 can comprise a lens mounting area or lens groove that is configured to at least partially receive the lens. The support member 754 can be moveable relative to the frame portion 752 to provide access to the groove in an open position and to retain the lens laterally within the groove in a closed position. In the closed position, the frame portion 752 and the support member 754 can secure the lens within the groove without exerting deformative force of the lens. Additionally, some embodiments can comprise one or more of the lens bumper features discussed herein.

In the illustrated embodiment of FIGS. 24A-B, the frame portion 752 can be considered to be fixed relative to the frame 750 while the support member 754 can be considered to be moveable relative to the frame 750. In this regard, such embodiments do not comprise a joint or hinge formed between two separate components in order to allow the frame portion 752 and the support member 754 to flex or open in order to interchange lenses in the frame 750. Instead, the support member 754 can be deflected downward relative to the frame portion 752 to allow a lens to be removed and/or replaced within the frame 750. In some embodiments, the eyeglass frame 750 can be formed monolithically, such as by injection molding, co-molding, or other such processes.

In such an embodiment, the support member 754 can be pivotally attached or coupled with the frame 750 and be configured to move between a retaining position and an open position. As such, the support member 754 can be moveable to the retaining position to capture at least a portion of the perimeter of the lens for mounting the lens in the path of the wearer's field of view. For example, the frame portion 752 and the support member 754 can move relative to each other at a movable or "living" joint or deflection zone 756 of the eyeglass 750. The deflection zone 756 can lie along any portion of the support member 754. For example, the deflection zone 756 can comprise a flexible portion of the support member 754. The support member 754 can be partially or entirely rigid, or partial or entirely flexible. In some embodiments, the deflection zone 756 can be positioned between or span the joint between the frame portion 752 and the support member 754.

Moreover, it is contemplated that the movable or "living" joint can be formed into the deflection zone 756 between the support member 754 and the frame portion 752 in order to allow the free ends 758 of the support members 754 to deflect towards or away from a bridge portion 760 of the frame portions 752. The joint can be formed into the deflection zone 756 of the eyeglass frame 750 through a dimensional variation from the frame portion 752 to the lower support member or jaw 754.

For example, the frame can taper in a given dimension while increasing in a second dimension. In this manner, such embodiments of the eyeglass can be quickly and conveniently formed. Further, the flexibility of the support member 754 can also result from a material difference in the frame 750, such as may result from injection molding or comolding of parts into a monolithic, continuous frame. For example, a flexible material can be injection molded or comolded with a more rigid material to allow the frame to be monolithic or continuous while allowing portions of the frame 750 to exhibit distinct strength properties. Such embodiments can also advantageously reduce the number of parts and facilitate operation by the user. These principles can be applied to any of the monolithic embodiments discussed herein.

In the illustrated embodiment of FIGS. 24A-B, the support member 754 can be deflected away from the frame portion 752 in order to allow sufficient passing clearance for a lens to be inserted into or removed from the eyeglass frame 750. As illustrated, in a dual lenses embodiment of the eyeglass, the support member 754 of each side of the eyeglass can be formed monolithically with the frame portion 752 thereof and configured to pivot, move, or deflect with respect to the frame portion 752. Thus, the support members 754 can further define free ends 758 that can be moved relative to a bridge portion 760 of the frame 750. Further, it is contemplated that the support member can comprise any of a variety of portions of the eyeglass frame, such as those shown in the embodiments illustrated in FIGS. 13-22C.

Similar to other embodiments disclosed herein, the frame 750 can further comprise one or more securing members 762. The securing members 762 can be configured to engage the free ends 758 of the support members 754. Similar to the embodiment described above with reference to FIGS. 13-18C (which disclosure is incorporated herein and not repeated for sake of brevity), the securing member 762 can comprise latch or nosepiece members. Further, in some embodiments, the one or more securing members 762 that can be pivotally attached to the bridge portion 760 to secure the free ends 758 in a closed position, as shown in FIGS. 24A-B. Other latching mechanisms disclosed herein can also be used to secure the support members 754 in a closed position.

For example, as discussed above with respect to FIGS. 13-18C, the support member 754 can comprise a securing member that is formed monolithically therewith such that the support member can engage the frame portion. In this manner, such embodiments of the support member 754 can achieve a fixed position and/or a retaining position relative to the frame portion. This can include a snap or friction fit. The discussion above is incorporated herein with respect to these embodiments and will not be repeated for sake of brevity.

Further, in some embodiments, the securing members 762 can also be monolithically formed with the eyeglass and configured to pivot, move, or deflect with respect to the frame 750. For example, the securing members 762 can be monolithically formed with the bridge portion 760 of the frame 750. An embodiment can be provided wherein the securing members 762 are formed of a material that permits the securing members 762 to deflect to allow the support members 754 to be disengaged or engaged therewith. In another embodiment, a movable joint can be formed into the junction between the securing members and the frame in order to enable the securing member to deflect to allow the support members to be disengaged or engaged therewith. Other securing mechanisms disclosed herein can also be used to secure the support members 754 in a closed position. Further, it is contemplated that the securing members 762 can be formed into any of a variety of the areas of the eyeglass frame, such as those shown in the embodiments illustrated in FIGS. 13-22C.

As noted above, embodiments are provided wherein the support members 754 can be formed of one or more materials that permit the support members 754 to deflect such that free ends 760 of the support members 754 can be separated from and moved toward the bridge portion 760 of the frame portions 752 to allow interchange of lenses. Such materials can comprise resilient plastics, composites, metals, and other such materials that can support repeated loading while maintaining desirable structural properties. Additionally, combinations of materials can be used in forming the eyeglass frame 750.

For example, a first material can be used to form the frame portion 752, and a second material that is different from the first material can be used to form the deflection zone 756 and/or the support member 754. In particular, one or more materials or components can be comolded into the eyeglass to provide optimal structural characteristics. In other words, some embodiments can comprise a separate component comolded into the deflection zone 756 in order to provide desirable structural properties while obtaining other desirable structural properties using the material comolded around the components to form the remainder of the eyeglass frame 750. These principles can be applied to any of the monolithic embodiments disclosed herein. Such embodiments are considered to be monolithically or continuously formed despite the use of multiple materials or components. For example, although multiple materials or components are used, these materials and components are not distinct parts that can be decoupled or separated from each other during use, even though portions thereof are perhaps deflectable and moveable relative to each other.

The embodiment illustrated in FIGS. 24A-B can also provide first and second lens mounting areas or grooves 770, 772 that are formed along an interior perimeter of the respective support members 754 and the frame portion 752. As similarly detailed above, the first and second grooves 770, 772 can define opposing banks and a bed disposed intermediate the opposing banks. The bed can define a float profile, and the opposing banks can each define respective retention profiles. The float profiles of the beds can be greater than corresponding profiles of the lenses, and the corresponding profiles of the lenses can be less than the retention profiles of the banks of the grooves 770, 772 such that the first and second lenses are permitted to move within the respective first and second grooves 770, 772 without disengaging from the groove.

FIGS. 25-28 illustrate another embodiment of the present inventions. FIG. 25 is a partial perspective view of an eyeglass 800 having a frame 802 in first and second lens supports 804, 806. The frame 802 can comprise a wire or nonwire frame. FIG. 26 is a cross-sectional view of the eyeglass 800 illustrated in FIG. 25. As shown in FIG. 26, a lens 808 is enabled to float within a lens mounting area or groove 810 of the first lens support 804. Accordingly, as discussed above with respect to various other embodiments, and in particular, FIGS. 7-9, the present embodiment can incorporate the various features related to the floating lands. As such, the discussion above will not be reproduced here, but can be referred to for further information with regard to the present embodiment.

FIG. 26 also illustrates a lens bumper 820 that is disposed in the groove 810. As discussed herein, one or more lens bumpers can be incorporated into any of the embodiments of the eyeglass frame disclosed herein. Indeed, any of the eyeglass frames disclosed herein can be provided with a tolerance buffering system. Such a system can comprise a plurality of lens bumpers for selective placement and replacement in the lens groove. Accordingly, the wearer can use the tolerance buffering system of lens bumpers for ensuring that a lens mounted in the frame is oriented in an optically-desirable position relative to the frame. This feature can be particularly advantageous because it allows the wearer to further customize the eyeglass (customization of the eyeglass can include interchanging lenses for optimizing the eyeglass depending on the activity of the wearer).

FIG. 27 is an enlarged cross-sectional view of FIG. 25 taken along section 27-27 of FIG. 26. FIG. 27 illustrates a lens bumper 820 disposed in the groove 810 of the first lens support 804 of the eyeglass 800. As the lens 808 can float in accordance with this embodiment, the lens bumper 820 can be used in the eyeglass 800 to compensate for any discrepancies in tolerances between the lens 808 and the groove 810.

Figure 28:
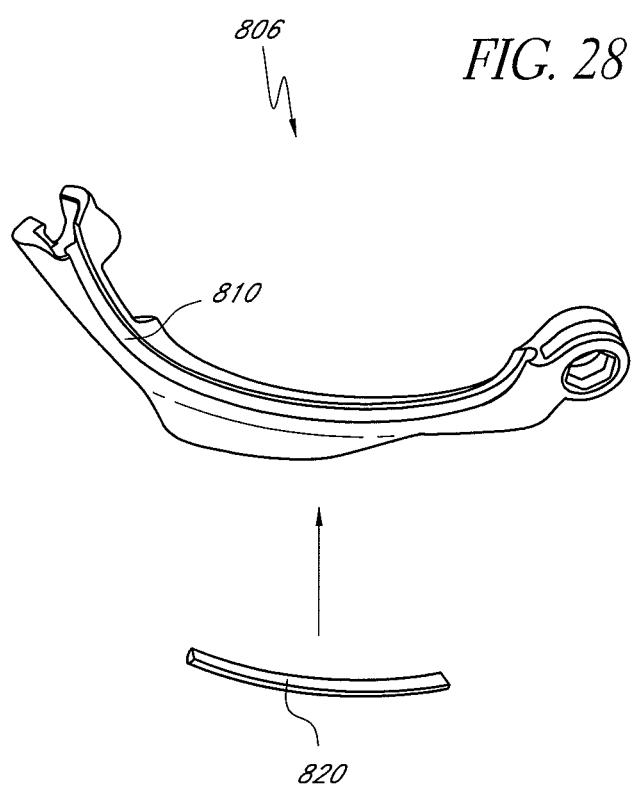
FIG. 28 is a top perspective view of a support member of an eyeglass frame and a lens bumper, in accordance with an embodiment.

For example, the lens bumper 820 can be selectively included or excluded from the eyeglass 800 depending on whether the eyeglass 800 meets a given tolerance requirements. FIG. 28 illustrates an exemplary embodiment of the lens bumper 820. As shown therein, the lens bumper 820 can comprise an elongated member that can be quickly positioned in a lens mounting area or groove 810 of the lens support, such as the second lens support 806 illustrated in FIG. 28. Further, the lens bumper 820 can be positioned along an upper or lower portion of the groove of the lens support. Where necessary, the lens bumper can be used in some embodiments to compensate for inaccuracies in manufacturing tolerances. Further, the lens bumper can also be used to provide a more exact orientation between the lens and the eyeglass. In particular, the lens bumper can be used to better align an optical axis of the lens with a straight-ahead line of sight of the wearer and to maintain a given orientation of the lens relative to the frame.

In addition, the lens bumper 820 can be used to prevent excessive movement of the lens 808 relative to the frame 802. The lens bumper 820 can protect the edges of the lens 808. Further, the lens bumper can be used to reduce lens chatter or rattling of the lens with in the groove of the frame.

FIGS. 29-31D provide various embodiments of lens supports that comprise one or more lens bumpers. The following discussion and accompanying figures are only exemplary, and one of skill in the art can modify these teachings readily based on the disclosure herein.

Figure 29:
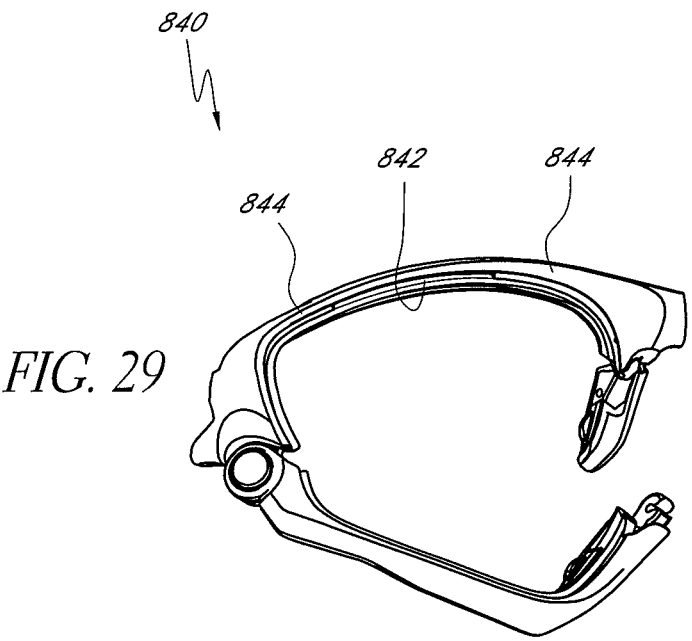
FIG. 29 is a partial bottom perspective view of an eyeglass frame having one or more bumpers for supporting a lens, according to an embodiment.
Figure 30:
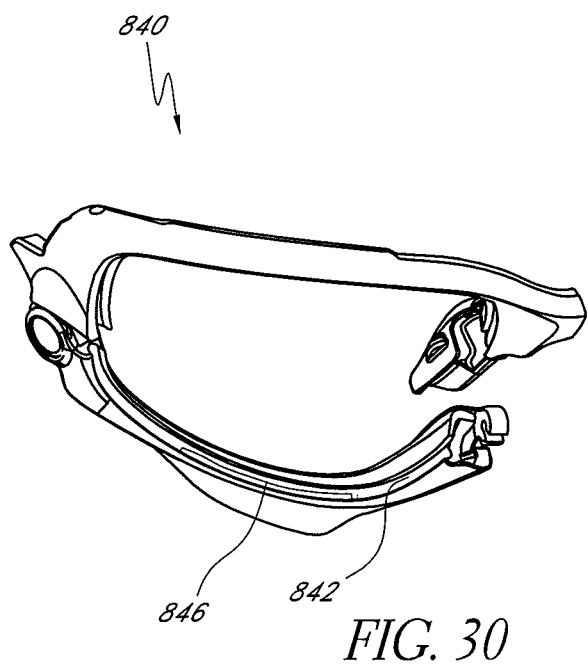
FIG. 30 is a partial top perspective view of an eyeglass frame having one or more bumpers for supporting a lens, according to yet another embodiment.

FIG. 29 is a bottom perspective view of a lens support 840 comprising a lens mounting area or groove 842 and at least one lens bumper component 844 disposed within the groove 842. FIG. 30 is a top perspective view of the lens support 840 showing at least one other lens bumper component 846 disposed within the groove 842. As noted in FIGS. 29-30, the first and second lens bumper components 844, 846 can extend along a portion of the groove 842. However, it is contemplated that various bumper components of different shapes and sizes, such as round, elongate, etc. can be generally spaced throughout the groove. In this regard, the lens bumper components may be able to advantageously contact one or more edges of a lens disposed within the groove.

Figure 31A:
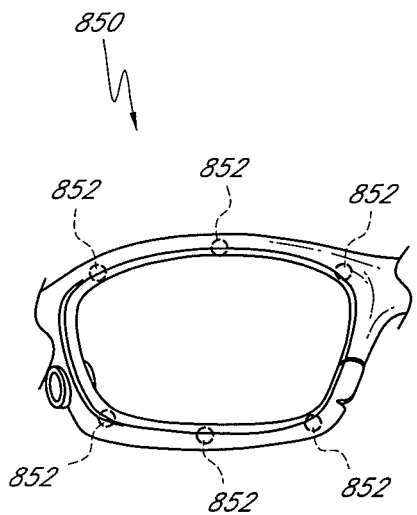
FIGS. 31A-D are partial front views of an eyeglass frame illustrating potential locations of one or more lens bumpers for supporting a lens, according to various embodiments.
Figure 31B:
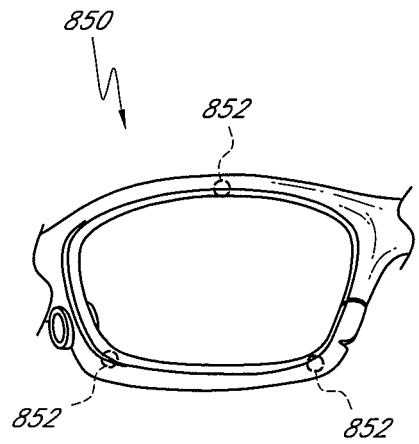
Figure 31C:
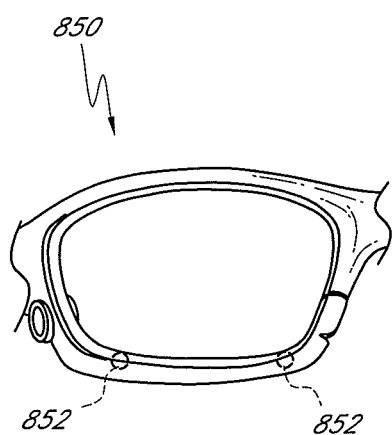
Figure 31D:
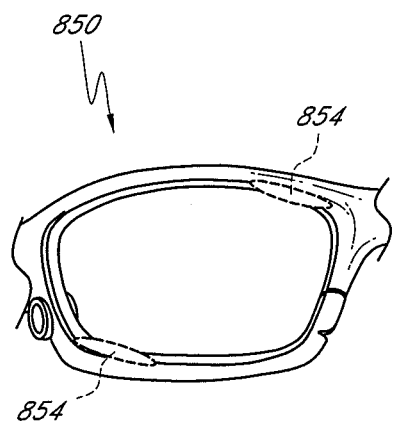

FIGS. 31A-C each illustrate a lens support 850 and a variety of potential lens bumper locations 852. As illustrated, there are various advantageous configurations in which the lens bumper components can be distributed about the lens support 850. Further, FIG. 31D illustrates potential locations 854 for multiple elongated lens bumper components.

FIGS. 32A-F each represent a cross-sectional view of a lens 860 disposed in a lens mounting area or groove 862 of an eyeglass taken along a medial-lateral axis of the groove. FIG. 32A illustrates a lens bumper component 864 having a generally triangular cross-sectional configuration. FIG. 32B illustrates a lens bumper component 866 having a generally rounded cross-sectional configuration. FIG. 32C illustrates a lens bumper component 868 having an egg-crate-type cross-sectional configuration. FIG. 32D illustrates a lens bumper component 870 that has a hollow cross-sectional configuration. FIG. 32E illustrates a lens bumper component 872 that has a split triangular cross-sectional configuration. Finally, FIG. 32F illustrates a lens bumper component 874 having a diamond-shaped cross-sectional configuration.

FIGS. 33A-B similarly illustrate potential embodiments of lens bumper components and are taken along an anterior-posterior axis of the eyeglass. FIG. 33A illustrates a plurality of lens bumper components 880 placed in a lens mounting area or groove 882 adjacent to each other below a lens 884. Further, FIG. 33B illustrates a plurality of lens bumper components 886 placed in a lens mounting area or groove 882 below a lens 884.

Figure 34A:
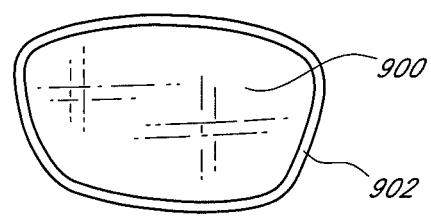
FIG. 34A is a front view of a lens for an eyeglass in which a lens bumper comprises a perimeter gasket disposed about the lens, according to an embodiment.
Figure 34B:
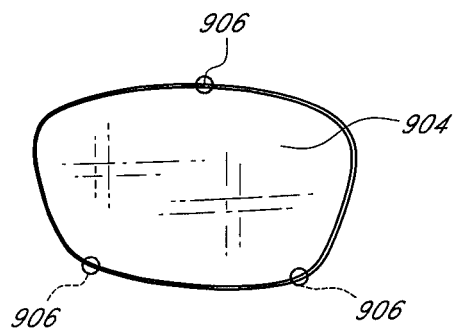
FIG. 34B is a front view of a lens for an eyeglass in which a plurality of lens bumpers are disposed about the lens, according to another embodiment.
Figure 35A:
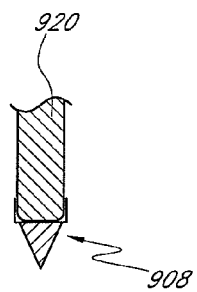
FIGS. 35A-F are partial side cross-sectional views each taken along a medial-lateral axis of a lens and illustrating cross-sectional geometries of embodiments of lens bumpers that are attachable to a lens, according to various embodiments.
Figure 35B:
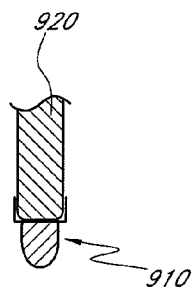
Figure 35C:
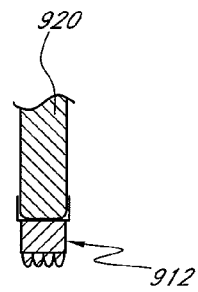
Figure 35D:
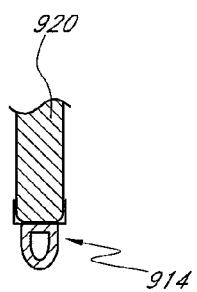
Figure 35E:
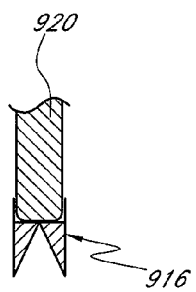
Figure 35F:
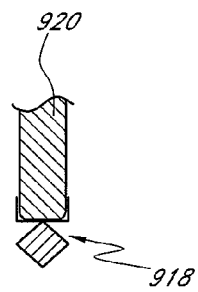

FIGS. 34A-B illustrates alternative embodiments in which lens bumper components are placed directly on a lens prior to insertion of the lens into a groove of a lens support of an eyeglass. For example, FIG. 34A illustrates a lens 900 having a lens bumper component 902 disposed generally about the entire periphery of the lens 900. Further, FIG. 34B illustrates a lens 904 comprising a plurality of individual lens bumper components 906 disposed at various locations about a periphery of the lens 904.

Figure 36A:
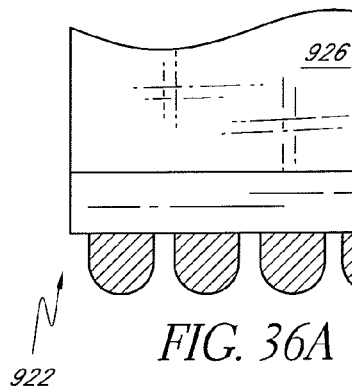
FIGS. 36A-B are partial side cross-sectional views taken along an anterior posterior axis and illustrating cross-sectional geometries of embodiments of lens bumpers attached to the lenses, according to various embodiments.
Figure 36B:
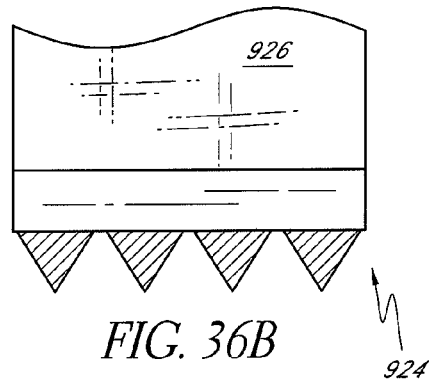

Additionally, FIGS. 35A-F illustrate additional alternative embodiments of the lens bumper components discussed above and are taken along an anterior-posterior axis of the lens. As shown in these figures respective lens bumper components 908, 910, 912, 914, 916, and 918 can be coupled to an edge of a lens 920. The cross-sectionals shapes of the lens bumper components generally resemble those discussed above in FIGS. 32A-F, and a description of the same will not be repeated. This is also the case for FIGS. 36A-B, and are taken along an anterior-posterior axis of the lens, which illustrate alternative embodiments for lens bumper components in 922, 924, respectively, that are attached to a lens 926.

The advantages and benefits of each of the foregoing cross-sectional shapes can be appreciated by one of skill in the art, and will not be enumerated further. However, it is contemplated that the lens bumper components can primarily be used to soak up engineering tolerances, as discussed above.

Figure 37:
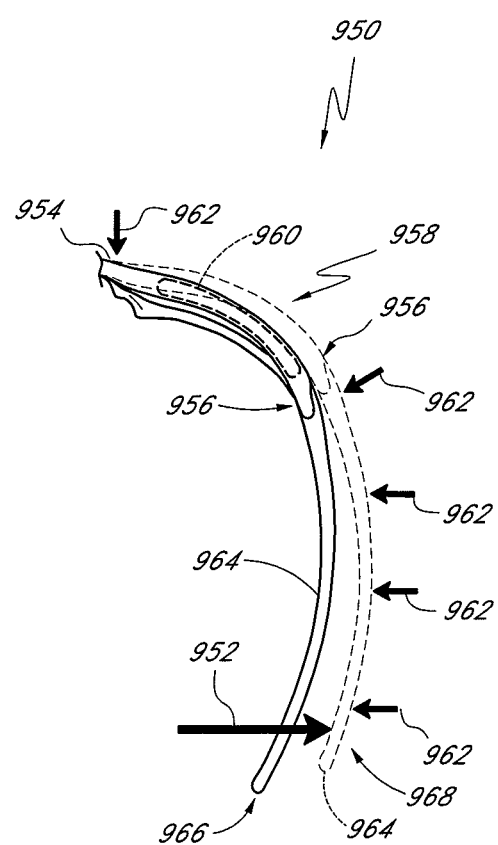
FIG. 37 is a partial top view of an eyeglass illustrating potential flex zones of the eyeglass for distributing transverse bending forces and flexural stress through the eyeglass, according to an embodiment.

Referring now to FIG. 37, another embodiment of the present inventions is provided. FIG. 37 is a top view graphic representation of an eyeglass 950 manufactured in accordance with another embodiment. As mentioned above, in order to prevent bending and distortion of the lens of an eyeglass, an embodiment provides for an eyeglass having one or more flex zones that are configured to receive flexural stresses of the eyeglass. Accordingly, the flexural stresses would be concentrated in the flex zones and would not be transferred to the lens support or lens. Thus, the eyeglass could prevent lens distortion from bending forces transmitted through the eyeglass.

In particular, FIG. 37 illustrates a bending force 952 acting in a medial-lateral direction and against an ear stem of the eyewear. In accordance with an embodiment, the eyeglass 950 can comprise a bridge flex zone 954 and at least one ear stem flex zone 956. Further, a lens support 958 can be reinforced in order to have additional rigidity and mechanical strength.

For example, it is contemplated that a support rib or insert 960 can be integrated with the lens support 958. The reinforcing rib or insert 960 can be of a material exhibiting high mechanical strength, especially relative to that of the eyeglass 950. Consequently, the lens support 958 having such a reinforcement rib 960 would be relatively stronger then the remaining components of the eyeglass 950. When the bending force 952 is exerted against the eyeglass 950, the counteracting forces and stresses 962 from the eyeglass 950 will be distributed through all other portions of the eyeglass 950 except for the lens support 958. In other words, when a bending force is exerted against, for example, an earstem 964 of the eyeglass 950 to move the earstem 964 from an unstressed position 966 to a stressed position 968, the reinforcing rib or insert 960 can prevent deformation of the lens support 958. Accordingly, other components of the eyeglass 950 would likely deflect or deform far before the reinforced lens support 958 deflects or deforms.

Furthermore, the reinforcing rib can be modified to further comprise one or more lens bumper components disposed thereon. Accordingly, in an embodiment, the reinforcing rib could be placed or mounted into a lens mounting area or groove of the eyeglass. As such, some embodiments of the rib could comprise a lens bumper component and be mountable within the groove. Thus, a reinforcing rib could both reinforce the strength of the lens support and "soak up" manufacturing tolerances such that a deep lens groove can receive an undersized lens.

In accordance with another embodiment, it is contemplated that the eyeglass can comprise one or more materials. The materials may be distinct and therefore have distinct mechanical properties. The eyeglass thus comprised can be formed using overmolding, which is a process known in the art.

Figure 38:
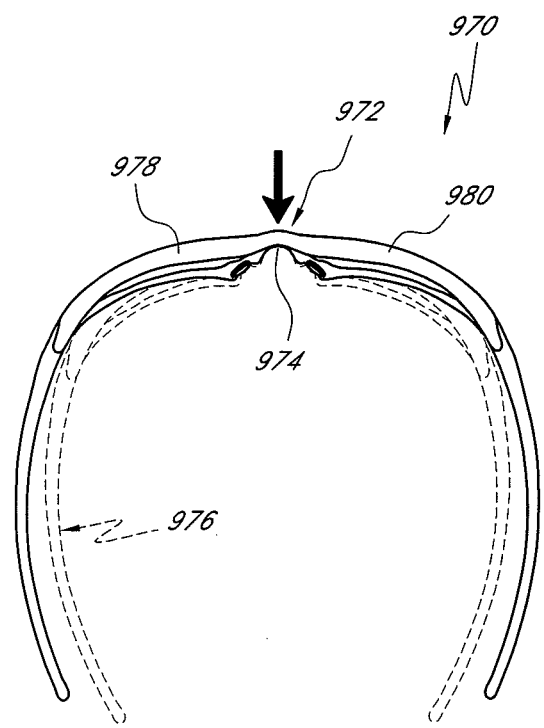
FIG. 38 is a top view of an eyeglass in which a bridge of the eyeglass is used as a flex zone for distributing transverse bending forces and flexural stress through the eyeglass, according to an embodiment.

FIG. 38 illustrates an embodiment comprising an eyeglass 970 having a flex zone 972 along a bridge portion 974 of the eyeglass 970. The eyeglass 970 is illustrated as being in a stressed state. The eyeglass 976 shown in hidden lines represents an eyeglass in an equilibrium state, without any forces being exerted thereon. Accordingly, a comparison of the configuration of the stressed eyeglass 970 (bending outwardly at the bridge, as marked by the arrow) and the equilibrium eyeglass 976 indicates that although the stressed eyeglass 970 has deflected in the bridge portion 974 thereof, its first and second lens supports 978, 980 have not been bended, and therefore, the lenses are still geometrically true and optically accurate.

Figure 39:
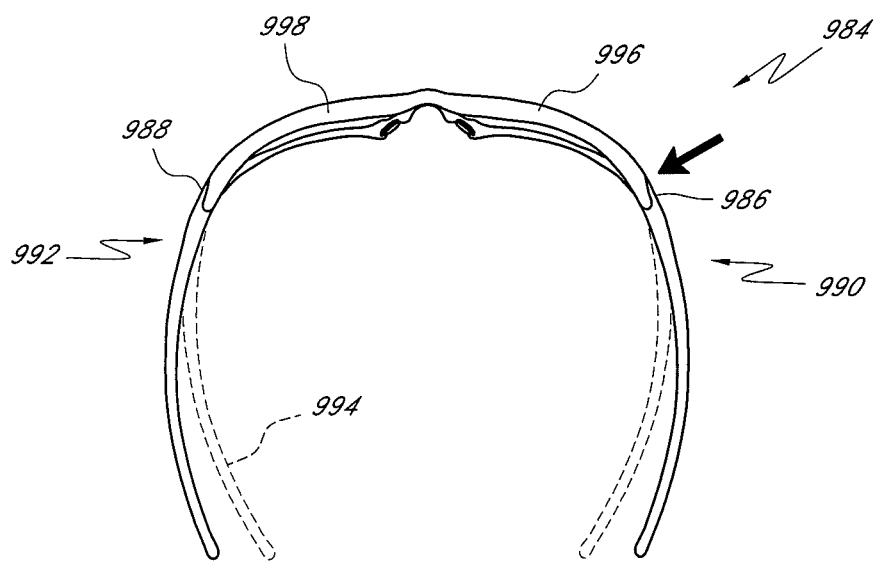
FIG. 39 is a top view of an eyeglass in which ear stem connectors of the eyeglass are used as flex zones for distributing transverse bending forces and flexural stress through the eyeglass, according to another embodiment.

Further, FIG. 39 illustrates an embodiment comprising an eyeglass 984 having a pair of flex zones 986, 988 disposed along respective first and second ear stem sections 990, 992 of the eyeglass 984. The eyeglass 994 shown in hidden lines represents an eyeglass in an equilibrium state, without any forces being exerted thereon. Accordingly, a comparison of the configuration of the stressed eyeglass 984 (bending outwardly at the earstem connection point, as marked by the arrow) and the equilibrium eyeglass 994 indicates that although the stressed eyeglass 984 has deflected along the first and second ear stem sections 990, 992, its first and second lens supports 996, 998 have not been bended, and therefore, the lenses are still geometrically true and optically accurate.

As mentioned above, each of the embodiments discussed herein can provide the wearer with the ability to selectively interchange lenses of their eyeglass. Many of the embodiments disclosed herein provide an eyeglass that allows for quick and easy interchangeability of lenses and other components of the eyeglass.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An eyeglass for maintaining geometry and optical quality of a lens supported by the eyeglass, the eyeglass comprising:
   a frame adapted to be carried by the head of a wearer, the frame extending at least partially about a perimeter of the lens;
   a support member pivotally attached to the frame at a first joint and at a second joint such that the support member can be pivoted relative to the frame between a retaining position and an open position, the support member being moveable to the retaining position to enclose at least a portion of the perimeter of the lens for mounting the lens in the path of the wearer's field of view; and
   a securing member being movable between an engaged position and a disengaged position, the securing member being in the engaged position to secure the support member in the retaining position for securing the support member to the frame, and wherein the securing member includes a nosepiece component configured to contact the wearer's nose to support the eyeglass.

2. The eyeglass of claim 1, wherein the securing member is disposed between the wearer and at least one of the support member and the frame when the securing member is in the engaged position and wherein the securing member moves in an anterior-posterior direction between the engaged and disengaged positions.

3. The eyeglass of claim 1, wherein the support member comprises first and second support members pivotally attached to the frame.

4. The eyeglass of claim 1, wherein the support member extends below the frame such that the frame supports an upper end of the lens and the support member supports a lower end of the lens.

5. The eyeglass of claim 1, wherein the lens comprises a first lens and a second lens configured to be respectively mounted in a path of a wearer's right eye and left eye field of view.

6. The eyeglass of claim 1, wherein the support member defines first and second ends, the first end thereof being pivotally attached to a first portion of the frame, the second end thereof being pivotally attached to a second portion of the frame at a laterally opposite end of the frame as the first portion of frame.

7. The eyeglass of claim 6, wherein the securing member is configured to engage with a protrusion positioned on the frame.

8. The eyeglass of claim 1, wherein the securing member pivots on a medial portion of the frame.

9. The eyeglass of claim 1, wherein each of the first and second joints comprises at least one of a hinge, bolt, and screw that the support member is configured to pivot about.

10. The eyeglass of claim 9, wherein the support member, the frame, and the securing member are individual components.

11. The eyeglass of claim 10, wherein the lens comprises a unitary lens configured to be mounted in the path of a wearer's field of view.

12. An eyeglass frame for maintaining an as-molded geometry of a lens, the frame comprising a frame portion and a support portion that are separate components, wherein the support portion is pivotally attached to the frame portion at first and second joints, the support portion and the frame portion defining a lens mounting area configured to at least partially receive the lens, the frame further comprising a nosepiece component having a disengaged position to enable the lens to move into or out of the lens mounting area and an engaged position in which the nosepiece component, the frame, and the support portion collectively secure the lens relative to the frame in the lens mounting area, the nosepiece component being configured to rest against the nose of the wearer during use, wherein the nosepiece component pivots when moving from the disengaged position to the engaged position.

13. The eyeglass frame of claim 12, wherein the nosepiece component pivots on the frame portion and moves in an anterior-posterior direction between the engaged and disengaged positions.

14. The eyeglass frame of claim 13, wherein the nosepiece component is unable to pivot into the disengaged position during use.

15. The eyeglass frame of claim 12, wherein the support portion is moveable relative to the frame portion to provide access to the lens mounting area in an open position and to retain the lens within the lens mounting area in a closed position.

16. The eyeglass frame of claim 12, wherein the lens comprises a first lens and a second lens configured to be respectively received in a path of a wearer's right eye and left eye field of view.

17. The eyeglass frame of claim 12, wherein in the engaged position, the nosepiece component is coupled to the support portion and the frame portion, wherein the support portion, the frame portion, and the nosepiece component are individual components.

18. The eyeglass frame of claim 17, wherein the first and second joints are positioned on opposite lateral ends of the frame relative to each other.

19. The eyeglass frame of claim 18, wherein each of the first second joints comprise at least one of a hinge, bolt, and screw that the support portion is configured to pivot about.

20. The eyeglass of claim 19, wherein the lens comprises a unitary lens configured to be received in a path of a wearer's field of view.

21. The eyeglass frame of claim 12, wherein the support portion and the frame define a groove for receiving the lens therein.

22. The eyeglass frame of claim 21, further comprising one or more lens bumpers disposed within the groove.

23. The eyeglass frame of claim 21, wherein the groove is formed along an interior perimeter of the frame and the support portion upon movement of the support portion to the retaining position, the groove defining opposing banks and a bed disposed intermediate the opposing banks, the bed defining a float profile, the opposing banks each defining respective retention profiles, the float profile of the bed being greater than a corresponding profile of the lens, a corresponding profile of the lens being less than the retention profiles of the banks of the groove such that the lens is permitted to move within the groove without disengaging from the groove.

24. The eyeglass frame of claim 12, wherein the frame and the support portion define a rigid enclosure into which a lens can be received, the rigid enclosure being configured to retain the lens without exerting deformative forces on the lens.

* * * * *

UNITED STATES PATENT AND TRADEMARK OFFICE
CERTIFICATE OF CORRECTION

| | |
|---|---|
| PATENT NO. | : 8,911,076 B2 |
| APPLICATION NO. | : 13/847048 |
| DATED | : December 16, 2014 |
| INVENTOR(S) | : Ryan Anthony Calilung |

It is certified that error appears in the above-identified patent and that said Letters Patent is hereby corrected as shown below:

In the Specification

In column 16 at line 17, Change "can defined" to --can be defined--.

In column 17 at line 57, Change "FIG." to --FIGS.--.

In the Claims

In column 32 at line 24, In Claim 19, change "first second" to --first and second--.

In column 32 at line 26, In Claim 20, after "eyeglass" insert --frame--.

Signed and Sealed this
Fifteenth Day of September, 2015

Michelle K. Lee
*Director of the United States Patent and Trademark Office*